(12) United States Patent  (10) Patent No.: US 7,508,535 B2
Hart et al.                (45) Date of Patent:    Mar. 24, 2009

(54) STAND ALONE MULTIMEDIA PRINTER WITH USER INTERFACE FOR ALLOCATING PROCESSING

(75) Inventors: Peter E. Hart, Menlo Park, CA (US);
Jonathan J. Hull, San Carlos, CA (US);
Jamey Graham, San Jose, CA (US);
Kurt W. Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 10/814,845

(22) Filed: Mar. 30, 2004

(65) Prior Publication Data

US 2005/0068571 A1     Mar. 31, 2005

Related U.S. Application Data

(60) Provisional application No. 60/506,411, filed on Sep. 25, 2003, provisional application No. 60/506,303, filed on Sep. 25, 2003, provisional application No. 60/506,302, filed on Sep. 25, 2003, provisional application No. 60/506,263, filed on Sep. 25, 2003, provisional application No. 60/506,206, filed on Sep. 25, 2003.

(51) Int. Cl.
*G06F 3/12* (2006.01)
*G06F 15/80* (2006.01)
*G06K 15/00* (2006.01)

(52) U.S. Cl. .............. 358/1.15; 358/1.16; 345/505

(58) Field of Classification Search ............. 358/1.15, 358/1.16, 518, 1.9, 1.4; 382/117, 118, 162, 382/170; 345/405, 619, 505; 709/205, 220
See application file for complete search history.

(56) References Cited

U.S. PATENT DOCUMENTS 4,133,007 A   1/1979   Wessler et al.

(Continued)

FOREIGN PATENT DOCUMENTS

CA    2386829    11/2002

(Continued)

OTHER PUBLICATIONS

"Using MPI—Portable Parallel Programming with the Message-Passing Interface", second edition, by William Gropp, Ewing Lusk and Anthony Skjellum, pp. 35-42, copyright 1999, MIT Press.*

(Continued)

*Primary Examiner*—James A Thompson
(74) *Attorney, Agent, or Firm*—Fenwick & West LLP

(57) ABSTRACT

A printing system for time-based data enables the printing of time-based media by sharing processing resources on a printer and on an external media processing system such as an external service, for example, a web service. The media processing may similarly be shared, as determined by a resource allocation module, or as indicated by a user via a user interface, between the printer and an external media processing system coupled via a communication interface to the printer or via a network. An example of such an external media processing system is an external device such as a personal computer or an external service such as a web service. A stand-alone version of the printer with embedded time based data in multiple media is described with a display and user interface so that a user can walk up to the printer and perform multimedia processing at the printer. The stand alone version has a network connection or other communication interface so that an external service or device can interface directly with the printer in performing media processing or a user can interface with the external service or device directly through the printer.

41 Claims, 15 Drawing Sheets

U.S. PATENT DOCUMENTS

| | | | |
|---|---|---|---|
| 4,205,780 A | 6/1980 | Burns et al. | |
| 4,437,378 A | 3/1984 | Ishida et al. | |
| 4,619,522 A | 10/1986 | Imai | |
| 4,635,132 A | 1/1987 | Nakamura | |
| 4,734,898 A * | 3/1988 | Morinaga | 369/30.85 |
| 4,754,485 A | 6/1988 | Klatt | |
| 4,807,186 A | 2/1989 | Ohnishi et al. | |
| 4,831,610 A | 5/1989 | Hoda et al. | |
| 4,881,135 A | 11/1989 | Heilweil | |
| 4,907,973 A | 3/1990 | Hon | |
| 4,998,215 A | 3/1991 | Black et al. | |
| 5,059,126 A | 10/1991 | Kimball | |
| 5,091,948 A | 2/1992 | Kametani | |
| 5,093,730 A | 3/1992 | Ishii et al. | |
| 5,115,967 A | 5/1992 | Wedekind | |
| 5,136,563 A * | 8/1992 | Takemasa et al. | 369/30.84 |
| 5,170,935 A * | 12/1992 | Federspiel et al. | 236/44 C |
| 5,220,649 A | 6/1993 | Forcier | |
| 5,231,698 A | 7/1993 | Forcier | |
| 5,237,648 A | 8/1993 | Mills et al. | |
| 5,270,989 A * | 12/1993 | Kimura | 369/30.93 |
| 5,343,251 A | 8/1994 | Nafeh | |
| 5,386,510 A * | 1/1995 | Jacobs | 345/505 |
| 5,428,555 A | 6/1995 | Starkey et al. | |
| 5,432,532 A | 7/1995 | Mochimaru et al. | |
| 5,436,792 A | 7/1995 | Leman et al. | |
| 5,438,426 A | 8/1995 | Miake et al. | |
| 5,444,476 A | 8/1995 | Conway | |
| 5,479,600 A | 12/1995 | Wroblewski et al. | |
| 5,480,306 A | 1/1996 | Liu | |
| 5,485,554 A | 1/1996 | Lowitz et al. | |
| 5,493,409 A | 2/1996 | Maeda et al. | |
| 5,568,406 A * | 10/1996 | Gerber | 702/159 |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A * | 5/1997 | Sugiyama et al. | 358/296 |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,540 A | 10/1997 | Klotz et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A | 2/1998 | Katsuo et al. | |
| 5,729,665 A | 3/1998 | Gauthier | |
| 5,749,735 A | 5/1998 | Redford et al. | |
| 5,757,897 A | 5/1998 | LaBarbera et al. | |
| 5,761,380 A | 6/1998 | Lewis et al. | |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A | 12/1998 | Tateyama et al. | |
| 5,877,764 A | 3/1999 | Feitelson et al. | |
| 5,884,056 A | 3/1999 | Steele | |
| 5,903,538 A | 5/1999 | Fujita et al. | |
| 5,936,542 A * | 8/1999 | Kleinrock et al. | 340/5.61 |
| 5,938,727 A | 8/1999 | Ikeda | |
| 5,940,776 A * | 8/1999 | Baron et al. | 702/4 |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,974,189 A | 10/1999 | Nicponski | |
| 5,987,226 A * | 11/1999 | Ishikawa et al. | 358/1.13 |
| 5,999,173 A | 12/1999 | Ubillos | |
| 6,000,030 A * | 12/1999 | Steinberg et al. | 713/200 |
| 6,006,241 A | 12/1999 | Purnaveja et al. | |
| 6,020,916 A | 2/2000 | Gerszberg et al. | |
| 6,038,567 A | 3/2000 | Young | |
| 6,043,904 A | 3/2000 | Nickerson | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A | 9/2000 | Huberman et al. | |
| 6,118,888 A * | 9/2000 | Chino et al. | 382/118 |
| 6,123,258 A | 9/2000 | Iida | |
| 6,125,229 A | 9/2000 | Dimitrova et al. | |
| 6,138,151 A | 10/2000 | Reber et al. | |
| 6,141,001 A | 10/2000 | Baleh | |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 | 1/2001 | Venkatraman et al. | |
| 6,175,489 B1 | 1/2001 | Markow et al. | |
| 6,189,009 B1 | 2/2001 | Stratigos et al. | |
| 6,193,658 B1 | 2/2001 | Wendelken et al. | |
| 6,199,042 B1 | 3/2001 | Kurzweil | |
| 6,256,638 B1 | 7/2001 | Dougherty et al. | |
| 6,296,693 B1 * | 10/2001 | McCarthy | 96/117.5 |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,302,527 B1 | 10/2001 | Walker | |
| 6,307,956 B1 | 10/2001 | Black | |
| 6,308,887 B1 * | 10/2001 | Korman et al. | 235/379 |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 | 4/2002 | Abgrall | |
| 6,373,585 B1 * | 4/2002 | Mastie et al. | 358/1.15 |
| 6,375,298 B2 | 4/2002 | Purcell et al. | |
| 6,378,070 B1 | 4/2002 | Chan et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,452,615 B1 | 9/2002 | Chiu et al. | |
| 6,466,534 B2 | 10/2002 | Cundiff, Sr. | |
| 6,476,793 B1 | 11/2002 | Motoyama et al. | |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | Fåhraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,535,639 B1 | 3/2003 | Uchihachi et al. | |
| 6,544,294 B1 | 4/2003 | Greenfield et al. | |
| 6,552,743 B1 | 4/2003 | Rissman | |
| 6,556,241 B1 | 4/2003 | Yoshimura et al. | |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,593,860 B2 | 7/2003 | Lai et al. | |
| 6,594,377 B1 | 7/2003 | Kim et al. | |
| 6,611,276 B1 | 8/2003 | Muratori et al. | |
| 6,611,622 B1 | 8/2003 | Krumm | |
| 6,611,628 B1 | 8/2003 | Sekiguchi et al. | |

| Patent | Date | Inventor |
|---|---|---|
| 6,625,334 B1 | 9/2003 | Shiota et al. |
| 6,647,534 B1 | 11/2003 | Graham |
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 * | 4/2004 | Danknick ............ 358/1.14 |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1 | 2/2006 | Impink, Jr. et al. |
| 7,023,459 B2 | 4/2006 | Arndt et al. |
| 7,031,965 B1 | 4/2006 | Moriya et al. |
| 7,075,676 B2 | 7/2006 | Owen |
| 7,079,278 B2 | 7/2006 | Sato |
| 7,089,420 B1 | 8/2006 | Durst et al. |
| 7,092,568 B2 | 8/2006 | Eaton |
| 7,131,058 B1 | 10/2006 | Lapstun |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,228,492 B1 | 6/2007 | Graham |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 | 11/2007 | Reese et al. |
| 7,363,580 B2 | 4/2008 | Tabata et al. |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 * | 1/2002 | Stevens et al. ............ 705/26 |
| 2002/0011518 A1 | 1/2002 | Goetz et al. |
| 2002/0015066 A1 | 2/2002 | Slwinski et al. |
| 2002/0023957 A1 | 2/2002 | Michaelis et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0095501 A1 | 7/2002 | Chiloyan et al. |
| 2002/0099534 A1 | 7/2002 | Hegarty |
| 2002/0101343 A1 | 8/2002 | Patton |
| 2002/0101513 A1 | 8/2002 | Halverson |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0137544 A1 | 9/2002 | Myojo |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0160898 A1 | 8/2003 | Baek et al. |
| 2003/0164898 A1 | 9/2003 | Imai |
| 2003/0177240 A1 * | 9/2003 | Gulko et al. ............ 709/226 |
| 2003/0187642 A1 | 10/2003 | Ponceleon et al. |
| 2003/0218597 A1 | 11/2003 | Hodzic |
| 2003/0220988 A1 * | 11/2003 | Hymel ............ 709/220 |
| 2003/0231198 A1 | 12/2003 | Janevski |
| 2004/0024643 A1 | 2/2004 | Pollock et al. |
| 2004/0036842 A1 | 2/2004 | Tsai et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engelson et al. |
| 2004/0143602 A1 | 7/2004 | Ruiz et al. |
| 2004/0156616 A1 | 8/2004 | Strub et al. |
| 2004/0167895 A1 | 8/2004 | Carro |
| 2004/0184064 A1 | 9/2004 | TaKeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2004/0249650 A1 | 12/2004 | Freedman et al. |
| 2005/0038794 A1 | 2/2005 | Piersol |
| 2005/0064935 A1 | 3/2005 | Blanco |
| 2005/0068569 A1 | 3/2005 | Hull et al. |
| 2005/0068581 A1 | 3/2005 | Hull et al. |
| 2005/0083413 A1 | 4/2005 | Reed et al. |
| 2005/0125717 A1 | 6/2005 | Segal et al. |

| | | | |
|---|---|---|---|
| 2005/0149849 | A1 | 7/2005 | Graham et al. |
| 2005/0213153 | A1 | 9/2005 | Hull et al. |
| 2005/0216838 | A1 | 9/2005 | Graham |
| 2005/0216852 | A1 | 9/2005 | Hull et al. |
| 2006/0043193 | A1 | 3/2006 | Brock |
| 2006/0136343 | A1 | 6/2006 | Coley et al. |
| 2006/0171559 | A1 | 8/2006 | Rhoads |
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0268164 | A1 | 11/2007 | Lai et al. |
| 2008/0037043 | A1 | 2/2008 | Hull et al. |

FOREIGN PATENT DOCUMENTS

| | | |
|---|---|---|
| CN | 1352765 A | 6/2002 |
| CN | 1097394 C | 12/2002 |
| EP | 1133170 A2 | 9/2001 |
| WO | WO 99/18523 | 4/1999 |
| WO | WO 02/082316 A1 | 10/2002 |

OTHER PUBLICATIONS

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Configuring A Printer (NT), Oxford Computer Support [online] [Retrieved on Nov. 13, 2003] Retrieved from the Internet<URL: http://www.nox.ac.uk/cehoxford/ccs/facilities/printers/configmt.htm>.

"DocumentMall Secure Document Management" [online] (Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronis (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL:http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

PostScript Language Document Structuring Conventions Specification, Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet <URL:http://www.i-love-epson.co.jp/products/spc/pma850/pma8503.htm>.

Gopal, S. et al., "Load Balancing in a Heterogeneous Computing Environment," Proceedings of the Thirty-First Hawaii International Conference on System Sciences, Jan. 6-9, 1998.

"Seiko Instruments USA, Inc.—Business and Home Office Products" online, date unknown, Seiko Instruments USA, Inc., [retrieved on Jan. 25, 2005]. Retrieved from the Internet. <URL: http://www.siibusinessproducts.com/products/link-ir-p-html>.

"Tasty FotoArt" (online), date unknown, Tague Technologies, Inc., [retrieved on Mar. 8, 3005]. Retrieved from the Internet: <URL: http//www.tastyfotoart.com>.

Gropp, W. et al., "Using MPI-Portable Programming with the Message Passing Interface," copyright 1999, pp. 35-42, second edition, MIT Press.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep. 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Juy-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle, WA.

Chinese Application No. 2004100849823 Office Action, Jun. 1, 2007, 24 pages.

Chinese Application No. 2004100897988 Office Action, Apr. 6, 2007, 8 pages.

Arai, T. et al., "PaperLink: A Technique for Hyperlinking from Real Paper to Electronic Content," CHI 97, Mar. 22-27, 1997, pp. 327-334.

Dorai, T. et al., "End-To-end Videotext Recognition for Multimedia Content Analysis," 2001 IEEE International Conference on Multimedia and Expo, IEEE, Aug. 2001, pp. 601-604.

Hecht, D.L., "Printed Embedded Data Graphical User Interfaces," Computer, Mar. 2001, pp. 47-55, vol. 34, Issue 3.

Karasik, D., "Image Processing in Perl Graphic Applications," Google, Apr. 2, 2003, pp. 1-12.

U.S. Appl. No. 10/660,867, filed Sep. 12, 2003, Erol et al.

Brown et al., "A Diary Study Of Information Capture in Working Life," Proceedings Of ACM CHI 2000 Conference On Human Factors In Computing Systems, 2000, pp. 438-455, vol. 1.

Erol, Berna et al., "Linking Multimedia Presentations With Their Symbolic Source Documents: Algorithm And Applications," ACM Multimedia '03, Nov. 2-8, 2003, pp. 498-507, Berkeley, CA.

Erol, Berna et al., "Prescient Paper: Multimedia Document Creation With Document Image Matching," 17th International Conference On Pattern Recognition, Aug. 2004, 4 pages, Cambridge, U.K.

Erol, Berna et al, "Retrieval Of Presentation Recordings With Digital Camera Images," IEE Conference On Computer Vision And Pattern Recognition (CVPR), Jun. 27-Jul. 2, 2004, 2 pages, Washington, D.C.\.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Lauesen, S., "User Interface Design: A Software Engineering Perspective," 2005, 28 pages.

Lienhart, Rainer et al., "Localizing And Segmenting Text In Images And Videos," IEEE Transactions On Circuits And Systems For Video Technology, Apr. 2002, pp. 256-268, vol. 12, No. 4.

"Microsoft Powerpoint—Wikipedia, the free encyclopedia," Wikimedia Foundation, Inc., [online] [Retrieved on Nov. 7, 2006] Retrieved from the intenet <URL:http://en.wikipedia.org/wiki/Microsoft_PowerPoint>.

Otsu, N., "A Threshold Selection method From Gray-Level Histograms," IEEE Transactions on Systems, Man and Cybernetics, Jan. 1979, pp. 62-66, vol. SMC-9, No. 1.

Srihari, S.N. et al., "Name And Address Block Reader System For Tax Form Processing," IEEE, 1995, pp. 5-10.

U.S. Appl. No. 09/714,785, filed Nov. 15, 2000.

* cited by examiner

STAND ALONE MULTIMEDIA PRINTER WITH USER INTERFACE FOR ALLOCATING PROCESSING

CROSS REFERENCE TO RELATED APPLICATIONS

This application claims the benefit of the following provisional patent applications, each of which is incorporated by reference in its entirety: U.S. Provisional Application No. 60/506,206, filed Sep. 25, 2003 entitled "Printer Driver, Interface and Method for Selecting and Printing Representations of Audio, Video or Processed Information;" U.S. Provisional Application No. 60/506,263, filed Sep. 25, 2003 entitled "Systems and Methods for Printing Audio or Video Paper;" U.S. Provisional Application No. 60/506,302, filed Sep. 25, 2003 entitled "Printer Including Interface and Specialized Information Processing Capabilities;" U.S. Provisional Application No. 60/506,303, filed Sep. 25, 2003 entitled "Printer Including One or More Specialized Hardware Devices;" and U.S. Provisional Application No. 60/506,411, filed Sep. 25, 2003 entitled "Printer for Non-Paper and Multiple Media Types."

This application is also related to the following co-pending patent applications, each of which is incorporated by reference: U.S. patent application entitled, "Printer User Interface," to Hart et al., filed Mar. 30, 2004, Ser. No. 10/814,700; U.S. patent application entitled, "User Interface for Networked Printer," filed Mar. 30, 2004, Ser. No. 10/814,500; U.S. patent application entitled, "Printer with Multimedia Server," filed Mar. 30, 2004, Ser. No. 10/814,842; U.S. patent application entitled, "Multimedia Output Device Having Embedded Encryption Functionality," filed Mar. 30, 2004, Ser. No. 10/814,841; U.S. patent application entitled, "Printer with Audio/Video Localization," filed Mar. 30, 2004, Ser. No. 10/831,946; U.S. patent application entitled, "Music Processing Printer," filed Mar. 30, 2004, Ser. No. 10/813,849; U.S. patent application entitled, "Printer With Audio or Video Receiver, Recorder, and Real-Time Content-Based Processing Logic," filed Mar. 30, 2004, Ser. No. 10/813,846; and U.S. patent application entitled, "Multimedia Print Driver Dialog Interfaces," filed Mar. 30, 2004, Ser. No. 10/814,944; U.S. patent application entitled, "Printing System With Embedded Audio/Video Content Recognition and Processing," filed Mar. 30, 2004, Ser. No. 10/813,950; and U.S. patent application entitled, "Printable Representations for Time-based Media," filed Mar. 30, 2004, Ser. No. 10/814,844. This application further incorporates by reference in their entirety the following co-pending patent applications (hereinafter, "the Video Paper patent applications"): U.S. patent application entitled, "Printable Representations for Time-based Media," filed Mar. 30, 2004, Ser. No. 10/814,844; U.S. application Ser. No. 10/001,895, filed Nov. 19, 2001; U.S. application Ser. No. 10/001,849, filed Nov. 19, 2001; U.S. application Ser. No. 10/001,893, filed Nov. 19, 2001; U.S. application Ser. No. 10/001,894, filed Nov. 19, 2001; U.S. application Ser. No. 10/001,891, filed Nov. 19, 2001; U.S. application Ser. No. 10/175,540, filed Jun. 18, 2002; and U.S. application Ser. No. 10/645,821, filed Aug. 20, 2003.

BACKGROUND

1. Field of the Invention

This invention relates generally to printing systems that have embedded functionality for printing time-based media, and in particular to a user interface for operating a printer that prints time-based media.

2. Background of the Invention

A conventional printer can receive documents or other data in a number of formats and then prints the contents of those documents or data in accordance with the proper format. But while conventional printers can print documents in a wide variety of formats, these printers are fundamentally limited in their ability to reproduce different kinds of media. For example, it is standard technology for a printer to produce images of static text, pictures, or a combination of the two. But because these printers print onto paper or another similar fixed medium, they cannot record the nuances of time-based media very well.

What is needed therefore is a printer that is equipped to print time-based media without the limitations of conventional printers. It is further desirable that such a printer be able to perform at least some of the necessary processing itself, while some of the processing may be performed by an external networked service and/or by another external device, rather than require an attached computer or other device performing all of the processing.

Additionally, these printers are fundamentally limited in their ability to take in contents from external media devices such as video cameras and cellular phones and process the data to create a useable record. For example, it is standard technology for a printer to produce images of static text, pictures, or a combination of the two. However, creating multimedia output from an external device typically involves several disparate steps, each potentially requiring considerable effort. Oftentimes, a user will have to convert and transfer multimedia data in different stages to different devices—for instance transferring a video clip from a video camera, then into a summary file containing excerpts of the video file, then to a memory or output device. While the processing of a multimedia file from an external device commonly involves the same repeated tasks, these tasks are not automated. In addition, because the multimedia data from an external device are typically not printed to a paper document, they are difficult to incorporate into the existing paper-based workflow by which most offices function.

Furthermore, what is needed is resource allocation means that can determine which media processing tasks are to be processed by a stand-alone multimedia printer and which by an external networked service or device, or which can allocate processing among the printer and the external service or device.

What is also needed is a user interface that permits a user to control the allocation of media processing between the stand-alone printer and an external service, or an external device, or both.

Additionally, it is desirable that the printer provide a variety of output media options. It is also desirable that the printer can provide storage for the various forms of output media for example in a multimedia content database.

SUMMARY OF THE INVENTION

To satisfy the needs unmet by conventional printers, a system for printing time-based data in accordance with an embodiment of the present invention comprises a media processing system residing at least in part on a networked multimedia printer and at least in part on an external media processing system. In a typical hardware configuration, a multimedia printer comprises a housing, for example a chassis, for supporting a print engine that produces a paper or other printed output and one or more electronic devices that produce a related electronic output. The printed and electronic outputs provide improved representations of the time-based media over that of a conventional paper printer.

In one embodiment of the system, the media processing system includes a resource allocation module for determining which tasks are to be processed by either of the external media processing system or the printer or the allocation of processing of a task between them. In one example, an external media processing system is an external networked service. An example of an external networked service is a web service, for example a web service providing encryption keys or a website for downloading movies or an application on a separate computer system for performing identity authentication against its database of profiles (e.g. a profile including a voice signature or video facial representation of a person). Another example of an external service or external device is another communicatively coupled multimedia printer. In another example, it is an external computing device such as a personal computer, a video camera, a cellular telephone or a personal digital assistant (PDA) having a physical or network connection to the printer. An interface coupled to the media processing system receives time-based media from an external source, such as an external media processing system, and can also send time-based media from the printer to an external system. Based on any of a number of desired applications, the media processing system determines a printed representation of the time-based media or an electronic representation of the time-based media, or both. In one embodiment, a printed output system in communication with the media processing system can receive the printed representation and produce a corresponding printed output. Similarly, an electronic output system in communication with the media processing system can receive the electronic representation and produce a corresponding electronic output. In this way, the printer creates a representation of time-based media by producing a printed output and/or an electronic output.

In another embodiment, the system for printing time-based media comprises a user interface which provides a user access to functionality of the printer, including the ability to select one or more time-based media processing functions for a media data content selection. Additionally, the user interface enables a user to allocate processing resources from among or between printer resources and external system resources.

In various embodiments, the system for printing time-based data includes different combinations of devices that allow for various mechanisms for receiving the media and various mechanisms for creating the electronic and/or printed outputs. In some combinations of devices, some of the devices reside within the printer and some are external devices that are coupled, typically communicatively, with the printer. For example, the interface may include a communication interface, a network communication interface, a removable media storage device reader, a video input device (such as a DVD reader or a video cassette reader), an audio input device (such as a CD reader or an MP2 player or an audio cassette reader), a media broadcast receiver, a radio receiver, screen capture hardware, a video and/or audio recorder, a digital video recorder (e.g. TiVO), a digital audio recorder, or any of a number of different types of devices that can receive time-based media. Similarly, the electronic output system may write the electronic representation to one or more different types of removable media storage devices, such as a DVD, a digital video recorder, a video cassette tape, a CD, an audio cassette tape, a digital audio recorder, a flash card, a computer disk, an SD disk, or another computer-readable medium. The electronic output system may also include a disposable media writer, a self-destructing media writer, a video display, an audio speaker, a driver for a speaker system (such as an embedded MIDI player), or an embedded web page display. In this way, a multimedia printer which performs multiple functions, can be configured to process data in multiple media forms by any of a large number of combinations of embedded subsystems and external media processing systems, allowing various embodiments of the printer to meet the needs of many different applications.

Because of the great many combinations of input and output devices possible for the time-based data printing system, the system may include hardware, software, or a combination thereof for performing a wide variety of different operations on the media. In this way, the system can be configured to produce various types of printed and electronic outputs based on received media to meet the needs of different applications. To solve various problems, in embodiments of the system, the media processing system can include one or more modules for performing a media processing task. In various embodiments, one or more media processing modules may be embedded in the printer, (e.g. an embedded multimedia server) or can reside on an external service or external device.

These different tasks may be performed on the printer by the media processing system, or partially on the printer by the media processing system in conjunction with one or more extrenal devices or external services capable of performing some of the required processing steps. The printer can thus avoid slow-downs that can result from a heavy processing load, which may be especially important for shared printers. The media processing system further comprises processing logic to control a task's processing between the printer and an external media processing system. The printing system can thus balance the required processing of the media between the printer and one or more external media processing systems. By conducting at least some of the processing on the printer, the printer relieves at least some of the processing load on external media processing systems.

DETAILED DESCRIPTION OF THE PREFERRED EMBODIMENTS

System Architecture

Figure 1:
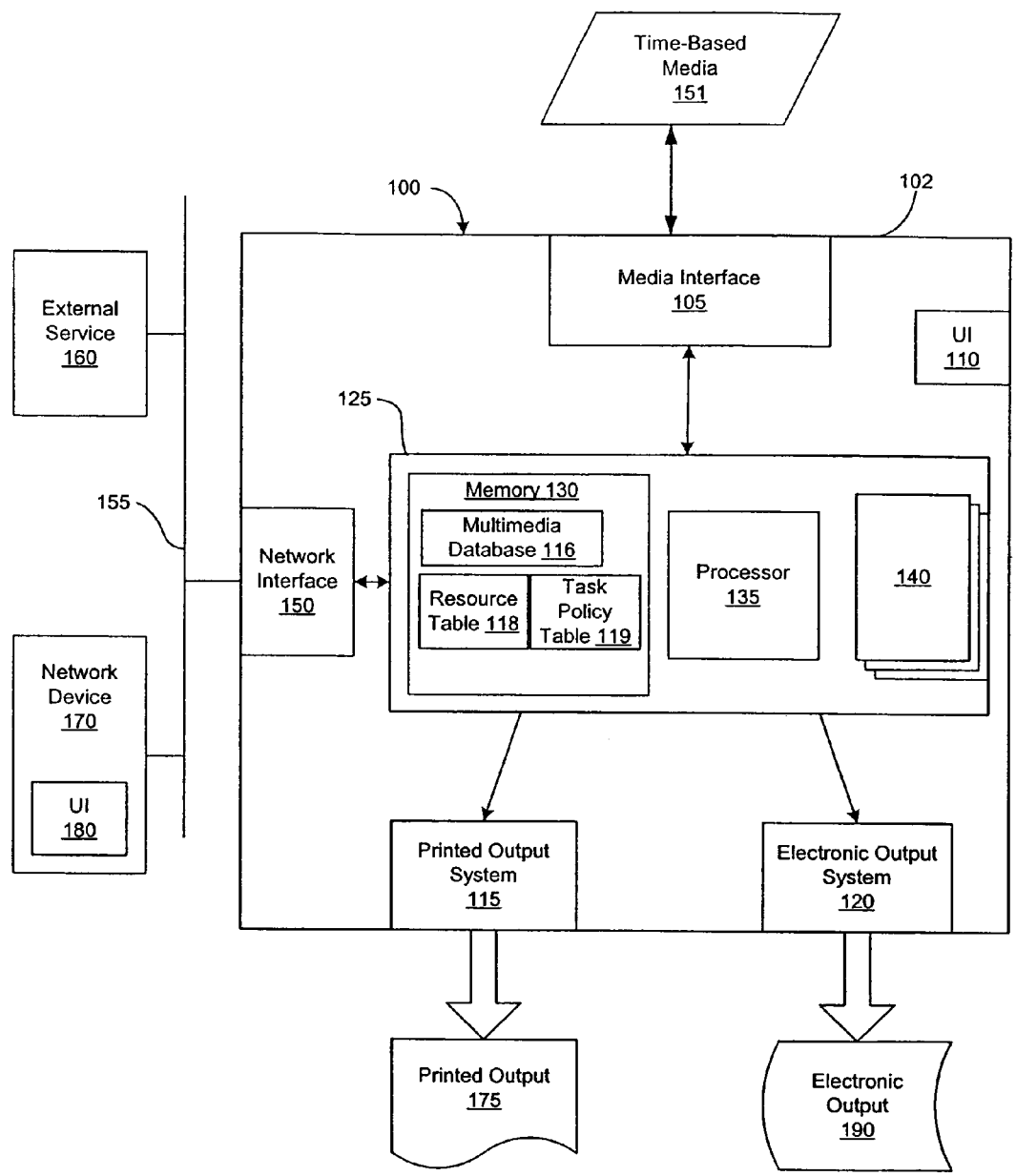
FIG. 1 is a schematic diagram of a system for printing time-based data in accordance with an embodiment of the present invention.

FIG. 1 is a high-level diagram of one embodiment of a system for printing time based data, which includes a multimedia processing printer 100 communicatively coupled via a network interface 150 to an external service 160 and a network device 170 via at least one network 155. Examples of networks 155 are the Internet or an internal network of a company, organization or enterprise. In this embodiment, printer 100 includes within or physically attached to a housing 102 (e.g. a chassis) a media interface 105, a user interface 110, a printed output system 115, an electronic output system 120, and a media processing system 125. Capable of receiving and sending time-based media 151, the media interface 105 can take a variety of forms and may include one or more devices that can receive and/or send media data or create media data by observing a media event. In one embodiment, the user interface 110 includes a display system, one or more user input devices (e.g. a touch screen, joystick, trackball, mouse, stylus, other pointing device, a keyboard or a keypad), software for processing input, and software for displaying output. The user interface 110 can also include other sensory output devices, for example, a speaker and a display. In one example, the display is embedded on the housing 102 for viewing. In another example, it is attached via a physical coupling to the printer 100. This allows for it to be wall mounted for example. In either example of an embedded or attached display, the display can also have a full-size screen. The user interface 110 may include a display system, software for communicating with an attached display, or any number of embodiments described in co-pending U.S. patent application entitled, "User Interface for Networked Printer," filed Mar. 30, 2004, Ser. No. 10/814,500, which application is incorporated by reference in its entirety. In one embodiment, the user interface 110 allows a user to make selections about the processing of media and/or about the format or destination of the printed 175 or electronic outputs 190. Similarly, the printed output system 115 and the electronic output system 120 can take a variety of forms and may each include one or more devices that can produce, respectively, a printed output 175 or an electronic output 190. Each of the interfaces for inputting and outputting are accessible via the housing 102.

In one embodiment, the media processing system 125 includes a memory 130, a processor 135, and one or more embedded functionality modules 140. In the embodiment of printer 100 illustrated in FIG. 1, the memory 130 of the media processing system 125 further comprises a resources table 118, a task policy table 119, and a multimedia database 116 for storing data, including time based media data, in various media formats including digitally based formats (e.g. MPEG, JPEG, MP-3). The database 116 can be stored on optical or digital storage mediums within the printer 100. The resources table 118 stores profiles for external media processing systems with which the printer 100 interacts, including the capabilities of the external systems. The task policy table 119 stores policies defining the allocation of printer resources and/or external system resources for the processing of a task. The embedded functionality modules 140, which are described in more detail below, may include software, hardware, or a combination thereof for implementing at least a portion of the functionality of the multifunction printer 100. The media processing system 125 is coupled to the media interface 105, allowing it to communicate therewith. The media processing system 125 is also coupled to the printed output system 115 and to the electronic output system 120 for providing the appropriate commands and data to those systems.

The printer 100 further includes a network interface 150, functionally coupled to the media processing system 125. The network interface 150 allows the printer 100 to communicate with other electronic devices, such as network device 170 and external service 160. In one example, the network interface 150 supports a broadband connection. In one embodiment, the network device 170 is a computer system, such as a personal computer. Beneficially, the network device 170 includes processing capability for performing any desired processing on the media data. In this way, the network device 170 can relieve the printer 100 of some of the processing load required to produce printed 175 and electronic outputs 190 from the time-based media. In one embodiment, the network device 170 includes a user interface 180 that allows a user to make selections about the processing of the media and/or about the format or destination of the printed 175 or electronic outputs 190. In other embodiments, the user interface 180 can be located on another attached device. In one embodiment, the user interface 180 includes a display system, one or more user input devices (e.g. a touch screen, joystick, trackball, mouse, stylus, other pointing device, a keyboard or a keypad), software for processing input, and software for displaying output. The user interface 180 can also include other sensory output devices, for example, a speaker and a display.

In another embodiment, the printer 100 is coupled to an external service 160, which includes hardware and/or software for performing some of the processing tasks on the media to be printed. In a typical embodiment, a remote service provider operates the external service 160. In such an embodiment, whereas the network device 170 may communicate with the printer 100 over a local area network, the external service may communicate with the printer 100 over a wide area network or over the Internet. By sharing the media processing tasks with an external service 160, possibly operated by a service provider, the printing system can perform tasks that are under the control of the service provider. In this way, a service can be set up around a particular form of media processing, where a user pays for use of the service.

Media Interface

Figure 3:
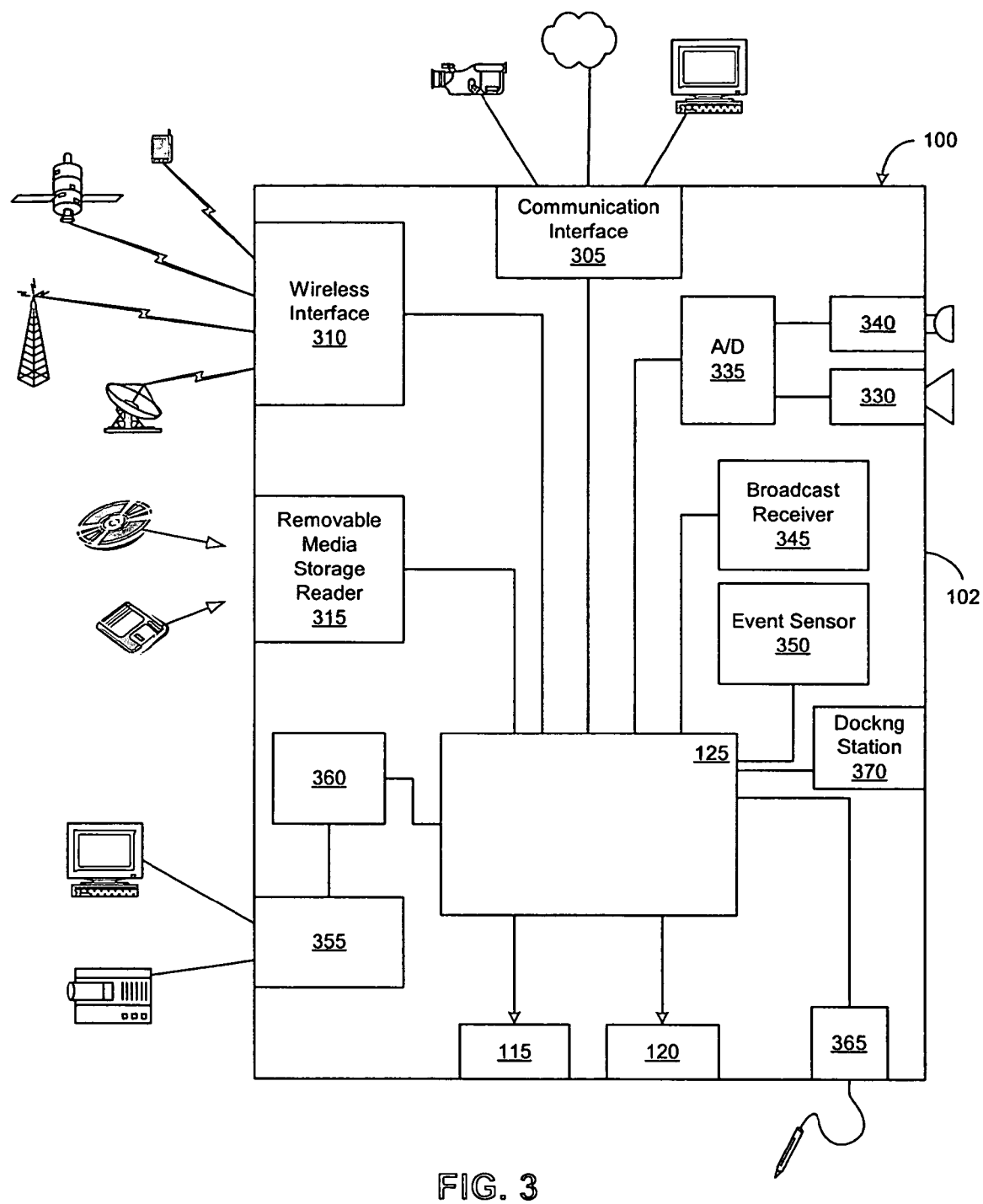
FIG. 3 is a schematic diagram of various media source input subsystems of the printer, in accordance with embodiments of the present invention.

The media interface 105 can be designed to accommodate any suitable type of time-based media. Because of the great variety of types and formats of media data, the media interface 105 may take any number of forms to accept any time-based media that a user might wish to print. FIG. 3 illustrates some examples of different interfaces 105 by which the stand alone printer 100 can receive media data from an external system or send data to an external system. In particular implementations, the stand alone printer 100 may have only one or only a subset of these types of interfaces 105, and in addition may have other types of interfaces not shown.

As shown in FIG. 3, the printer 100 may include a communication interface 305 that allows the printer 100 to be communicatively coupled to at least one other electronic device. Depending on the desired input, the interface 305 may allow the printer 100 to communicate with a wide variety of different electronic devices that can provide the printer 100 with time-based media to print. Without intending to limit the types of devices, the interface 305 may allow the printer 100 to receive media data from external sources such as computer systems, computer networks, digital cameras, cellular telephones, PDA devices, video cameras, media renderers (such as DVD and CD players), media receivers (such as televisions, satellite receivers, set-top boxes, radios, and the like), digital video recorders (such as a TiVO), a portable meeting recorder, external storage devices, video game systems, or any combination thereof. The connection type for the interface 305 can take a variety of forms based on the type of device that is intended to be connected to the printer 100 and the available standard connections for that type of device. For example, the interface 305 may comprise a network interface, for example an interface supporting a broadband network connection, for sending and receiving time-based data in multiple media forms to or from an external service or device. For example, the interface 305 may comprise a port for connecting the device using a connection type such as USB, serial, FireWire, SCSI, IDE, RJ11, parallel port (e.g., bi-directional, Enhanced Parallel Port (EPP), Extended Capability Port (ECP), IIEEE 1284 Standard parallel port), optical, composite video, component video, or S-video, or any other suitable connection type.

In another embodiment, the printer 100 includes a wireless interface 310. As illustrated, the wireless interface 310 allows the printer 100 to receive media data from or send media data to a wireless device external to the printer 100. The wireless interface 310 may allow the printer 100 to communicate with any number of wireless communication systems, such as wireless components on a home or business network, cellular phones and other portable wireless devices, satellites, satellite dishes, and devices using radio transmissions. Depending on the types of external devices with which the printer 100 is desired to communicate, the wireless interface 310 may comprise hardware and/or software that implements a wireless communications protocol, such as that described in IEEE 802.11, IEEE 802.15, IEEE 802.16 or the Bluetooth standard.

In another embodiment, the printer 100 receives media data from a removable media storage reader 315 that is built into the printer 100. The removable media storage reader 315 may be configured to accommodate any type of removable media storage device, such as DVDs, CDs, video cassette tapes, audio cassette tapes, floppy disks, ZIP disks, flash cards, micro-drives, memory sticks, SD disks, or any other suitable type of media storage devices. Moreover, the printer 100 may have a plurality of removable media storage readers 315 to accommodate multiple types of media storage devices.

In another embodiment, the printer 100 includes a docking station 370 that is built into the printer 100. In another example, the docking station is a component attachable to the printer's housing 102 which provides access to a communication interface (e.g. 305) of the printer 100. The docking station 370 may be configured to accommodate any type of external devices, such as cell phones, digital audio recorders, video camcorders, portable meeting recorders, fixed position meeting recorders, head-mounted video cameras, office-based PC experience capture systems, or any other suitable type of multimedia external devices. Moreover, the printer 100 may have a plurality of docking stations 370 to accommodate multiple types of external devices. Furthermore, it will be understood that an external device may also be communicatively coupled to the communication interface 305 via an external docking station.

In another embodiment, the printer 100 includes an embedded video recorder 330. In this embodiment, the external source of media data is a series of images captured by the embedded video recorder 330. The video recorder 330, such as a camera, CCD, or other suitable mechanism for capturing a sequence of images, converts a scene into a suitable electrical format, such as that described in the MPEG, H.263, or H.264 standards. Optionally, an analog-to-digital converter 335 converts an image directly from the video recorder 330 into a digital format, which is then provided to the media processing system 125. In yet another embodiment, the media processing system 125 receives raw video data from the video recorder 330 and performs any necessary conversion, encoding, and compression on the video data.

In another embodiment, the printer 100 includes an embedded audio recorder 340. In this embodiment, the external source of media data is a series of sounds that are converted into an electrical format by the embedded audio recorder 340. The audio recorder 340 converts the recorded sound signal into a suitable electrical format, such as that described in MPEG-2. Optionally, an analog-to-digital converter 335 converts the sound directly from the audio recorder 340 into a digital format, which is then provided to the media processing system 125. In yet another embodiment, the media processing system 125 receives raw audio data from the audio recorder 340 and performs any necessary conversion, encoding, and compression on the audio data.

In another embodiment, the printer 100 comprises a media broadcast receiver 345. The media broadcast receiver 345 can be tuned to a media broadcast from a media broadcaster. Types of media broadcasts that can be tuned into and received include broadcasts from the Internet, cable, television, radio, and any other broadcasted media source. To tune into a particular media broadcast, a user may select the broadcast using the user interface 110. In one embodiment, the broadcast receiver 345 is an embedded TV receiver, an embedded radio receiver, an embedded short-wave radio receiver, an embedded satellite radio receiver, an embedded two-way radio, an embedded cellular phone, or a combination of any of the above. However, these are not meant to be limiting, as the broadcast receiver 345 can be any device that is capable of tuning into a signal and receiving media data therefrom.

In another embodiment, the printer 100 includes an embedded event sensor 350 that receives a signal about or otherwise observes a real-world event. Similar to a broadcast receiver 345, the event sensor 350 may receive data about a real-world event, for example, by an embedded National Weather Service radio alert receiver or an embedded TV Emergency Alert System (EAS) alert monitor. Alternatively, the event sensor 350 may comprise an embedded heat sensor, an embedded humidity sensor, or another type of measuring device so that the event sensor 350 can directly measure the environment and generate time-based media therefrom. In this way, the printer 100 can be used to record events near the printer or far from it and generate meaningful time-based informational outputs based on those events.

In another embodiment, the printer may include video capture hardware 355. In one embodiment, the video capture hardware 355 is designed to be coupled to a computing system by a video cable thereof. The video cable from a display is attached to the printer 100, where the video signal is split with one signal directed to the computing system and another signal to the video capture hardware 355. The video capture hardware 355 performs a differencing between successive frames of the video signal and saves frames with a difference that exceeds a threshold on a secondary storage in the printer 100. This offloads such processing from the computing system, thereby improving responsiveness and user experience and providing an easily browseable record of a user's activities during the day. To take advantage of the printing capabilities of the multifunction printer, the user can choose to print selected frames captured by the video capture hardware 355. The printing can be generated on demand with the user interface 110 on the printer or from an attached computing device (e.g. via 105), a networked external device 170, or an external networked service 160, or automatically with scheduling software. In this way, a user can view a replay of any actions taken on the computing system. Notably, the captured content can be effectively compressed because the differences between frames are small.

In another embodiment, the video capture hardware 355 is coupled to a converter module 360, such as VGA-to-NTSC conversion hardware. Such an embodiment could be used in conjunction with a projector to capture presentations made with the projector. Audio capture could also be employed to record a speaker's oral presentation. To use the video capture hardware 355 in this way, a user could connect a laptop or other computing system and the projector to the printer 100. The printer 100 then captures video frames as fast as it compares them to the most recently captured frame and retains those frames that are different. A parallel audio track may also be saved. This capability could also be used in a desktop printer to record a presentation made on a computing system connected to the printer. The printer can then save the audio itself or it can be written to a digital medium, such as an SD disk that can be played from a cell phone or a PDA. The audio could also be written to a bar code on a printed representation.

In another embodiment, the printer 100 comprises an ultrasonic pen capture device. In this embodiment, the printer 100 includes an ultrasonic pen capture device hardware module 365 that serves as a low-cost sensor that can be coupled to a paper document. With such a device, a user can write on a paper document, and the results are saved on the printer 100. In one form, the captured results include the user's writing in combination with time data that indicates when the writing occurred. This time-based media data can then be printed or sent (e.g., by electronic mail) to someone else, for example showing a user's notes as well as time stamps that indicate when the notes were taken. It is noted that there are several other methods for capturing pen strokes and time data, using pens that scan patterns printed on paper, or using special writing surfaces such as electromagnetic tablets.

Printed Output System

The printed output system 115 may comprise any standard printing hardware, including that found in standard laser printers, inkjet printers, thermal wax transfer printers, dye sublimation printers, dot matrix printers, plotters, or any other type of printing mechanisms suitable for creating a printer image on an appropriate physical medium. In the example described herein, a laser printer mechanism is described; however, it should be understood that any suitable printing system can be used. The printer 100 includes any necessary subsystems, as known by one skilled in the art, to print on a printable medium, such as a sheet of paper.

Figure 4:
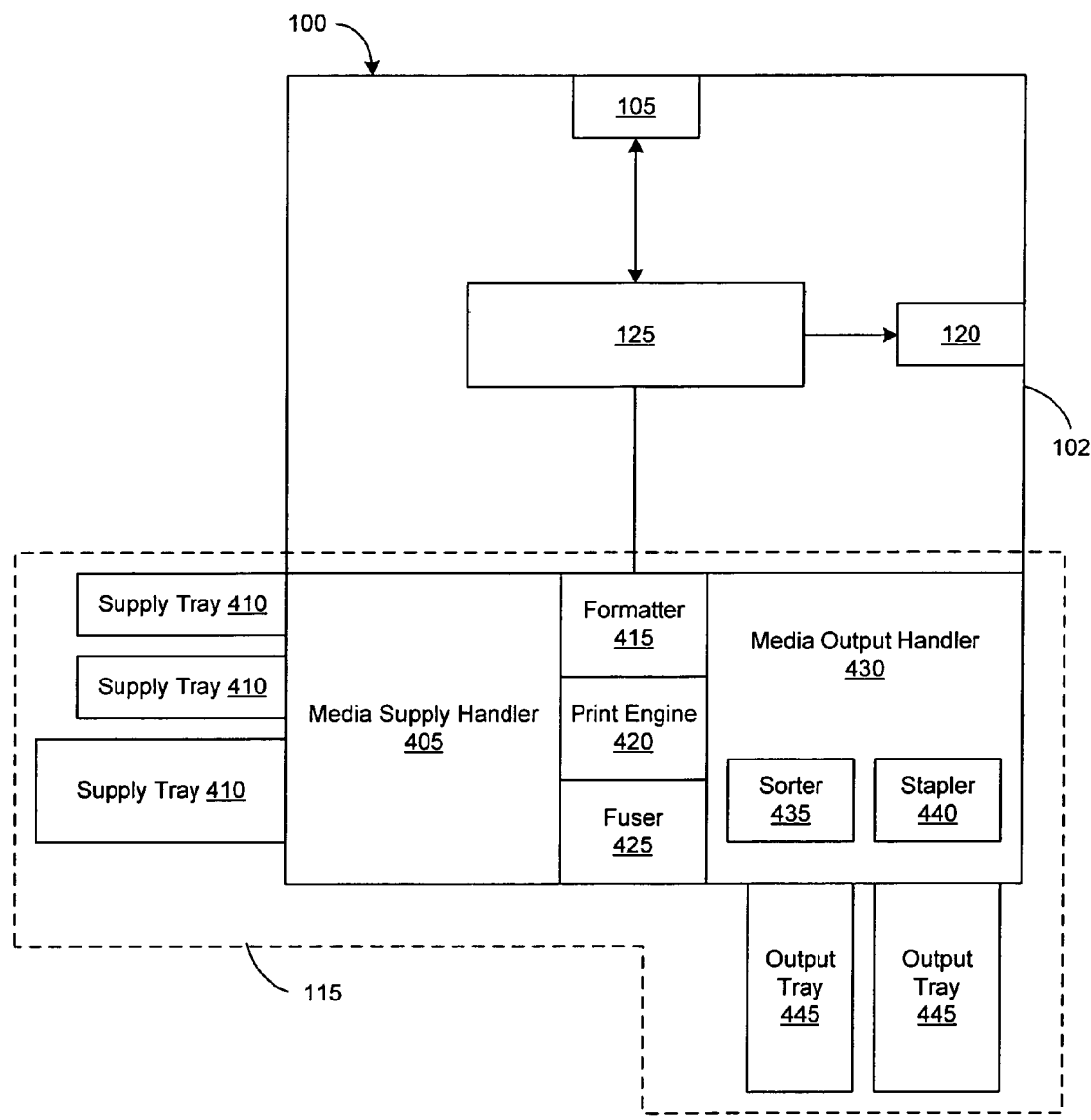
FIG. 4 is a schematic diagram of the printer's printed output system, in accordance with an embodiment of the present invention.

FIG. 4 is a schematic diagram of the printer's 100 printed output system 115 in accordance with an embodiment of the present invention. The printed output system 115 comprises a media supply handler 405 that receives blank paper to be printed on. The media supply handler 405 typically obtains the paper from a supply tray 410. The printer 100 may include multiple supply trays 410, allowing the printer to accommodate different sizes and types of paper as well as trays 410 of varying capacity. When the printer 100 needs blank paper for printing, the media supply handler 405 provides the print engine 420 with a sheet of blank medium.

The formatter 415 converts data received from the media processing system 125 into a format that the print engine 420 can use to create an image on the paper. The print engine 420 creates an image on the paper as indicated by the formatter 415. A fuser 425 then uses high temperature and pressure to fuse the image onto the paper to fix the image thereon. Once the image is fixed, the paper is fed to the media output handler 430. Although not shown, it is appreciated that the printer 100 includes any necessary motors, gears, and diverters to cause the paper to move through the printer 100.

The media output handler 430 receives one or more printed sheets of paper and performs any requested finishing to the sheets. For example, the media output handler 430 may include a sorter 435 to sort or collate the sheets for multiple copies and a stapler 440 to attach the sheets together. When the finishing processing is complete, the media output handler 430 moves the sheets to an output tray 445, of which there may be multiple trays 445 to accommodate different sizes, types, and capacities of printed output.

Electronic Output System

Figure 5:
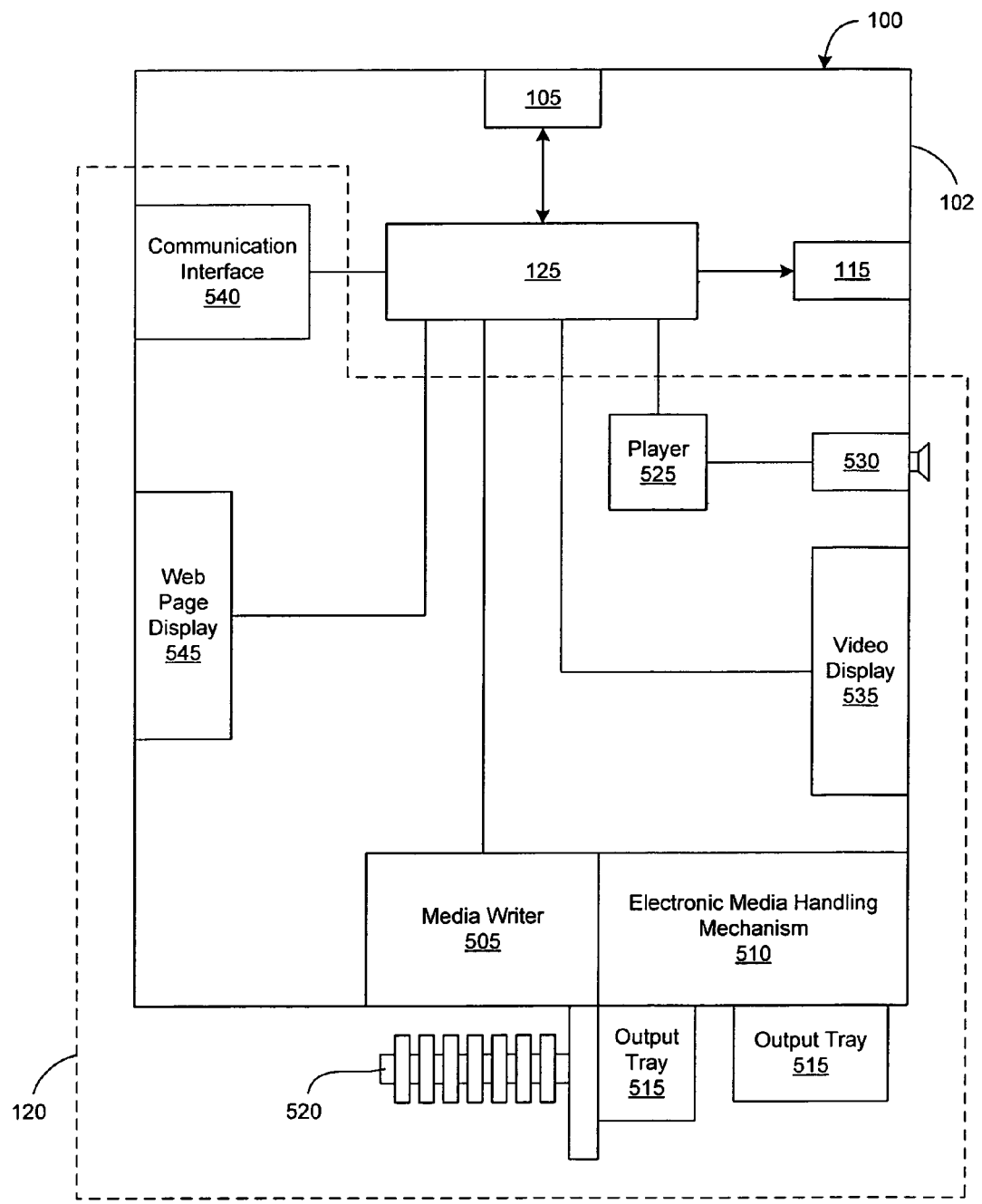
FIG. 5 is a schematic diagram of various electronic media output systems of the printer, in accordance with embodiments of the present invention.

The electronic output system 120 can be designed to produce an electronic output 190 related to the media data in any desired format. Because of the great variety of types and formats of electronic outputs 190, the electronic output system 120 may take any of a number of forms for producing an electronic output 190 desired by the user. FIG. 5 illustrates some examples of different embodiments of the electronic output system 120. In particular implementations, the printer 100 may have only one or only a subset of the various components shown, and in addition it may have other types not shown.

In one embodiment, the printer 100 writes the electronic output 190 to a removable media device with a media writer 505. Many different types of media writers are known in the art, and the media writer 505 may comprise any of these. For example, the media writer 505 may be configured to write the electronic output 190 to removable storage devices such as a writeable DVD or CD, a video cassette tape, an audio cassette tape, a flash card, a computer disk, an SD disk, a memory stick, or any other appropriate electronically-readable medium. Moreover, the electronic output system 120 may include a number of media writers 505 of different types to allow the printer 100 to print onto different electronic formats. In addition, the electronic output system 120 may include a number of media writers 505 of the same type to increase the output capacity of the printer 100.

The removable storage device that receives the electronic output 190 from the printer 100 may be fed to the media writer directly by a user, for example by inserting a blank disk into a drive. In another embodiment, the printer 100 includes an electronic media handling mechanism 510 coupled to the media writer 505 that automatically provides the media writer 505 with an appropriate type of removable storage device. The handling mechanism 510 may further be configured to physically place written to storage devices into an output 515. In one embodiment, a series of blank storage devices are fed to the printer 100 by a bandolier 520 or other type of feeder, allowing the printer 100 to create a high volume of electronic output 190 without requiring a significant amount of interaction with a human operator. The bandolier 520 preferably then places the written to devices into an output tray 515.

In another embodiment, the media writer 505 is a disposable media writer, configured to write electronic data to a disposable removable media storage mechanism. In another embodiment, the media writer 505 writes the electronic data to a self-destructing medium. In this way, a user can view the electronic data for a predetermined number of times or during a predetermined period of time, after which the electronic data are no longer viewable.

In another embodiment, the electronic output system 120 includes a speaker system 530. The speaker system 530 is designed to receive an audio signal from the media processing system 125, in response to which the audio is played from an embedded speaker 530 in the printer 100. The electronic output system 120 may further include a player 525 or audio renderer that receives an encoded audio signal from the media processing system 125 and converts it into an audio signal for the speaker 530. The player 525 thus-takes some of the processing load off the media processing system 125. For example, the player 525 may include a MIDI player for generating the audio signal; however, many other audio renderers may be used, in either hardware or software.

In another embodiment, the electronic output system 120 includes a video display 535. The video display 535 is designed to receive a video signal from the media processing system 125, in response to which the video is played on the video display 535 embedded into the printer 100 (e.g. on the housing 102 for viewing). For example, it may be part of the user interface 110. In another example, it is attached via a physical coupling to the printer 100. This allows for it to be wall mounted for example. In either example of an embedded or attached display, the display can also have a full-size screen. Similarly, the video display 535 may receive the video signal directly from a driver to reduce the processing load on the media processing system 125.

In another embodiment, the printer 100 transmits the electronic output 190 that is to be printed to another device as a signal. This signal can later be fixed in a tangible medium by the external device. To facilitate this, the electronic output system 120 includes a communication interface 540. The communication interface 540 receives the electronic output 190 from the media processing system 125 and sends the electronic output 190 to the external device, which may be in communication with the printer 100 over a local network, the Internet, a wireless network, a direct connection, or any other suitable communication means.

In another embodiment, the electronic output system 120 comprises an embedded web page display 545. The web page display 545 allows a user to see a representation of the electronic output 190 in a web-based form. In one example, the display is embedded on the housing 102 for viewing. For example, it may be part of user interface 110. In another example, it is attached via a physical coupling to the printer 100. This allows for it to be wall mounted for example. In either example of an embedded or attached display, the display can also have a full-size screen.

Media Processing System

The media processing system 125 of the printer 100 is designed to perform the specialized functionality of the multifunction printer 100. To send and receive data such as messages or time-based data between the external service 160 or the external device 170, the processing system 125 includes a processor 135 and a memory 130. In addition, the media processing system includes one or more hardware and/or software modules 140 that enable the printer 100 to create related printed 175 and electronic outputs 190 for different types of time-based media. In this way, the printer 100 can be configured to have any number of media processing functionalities.

Figure 6:
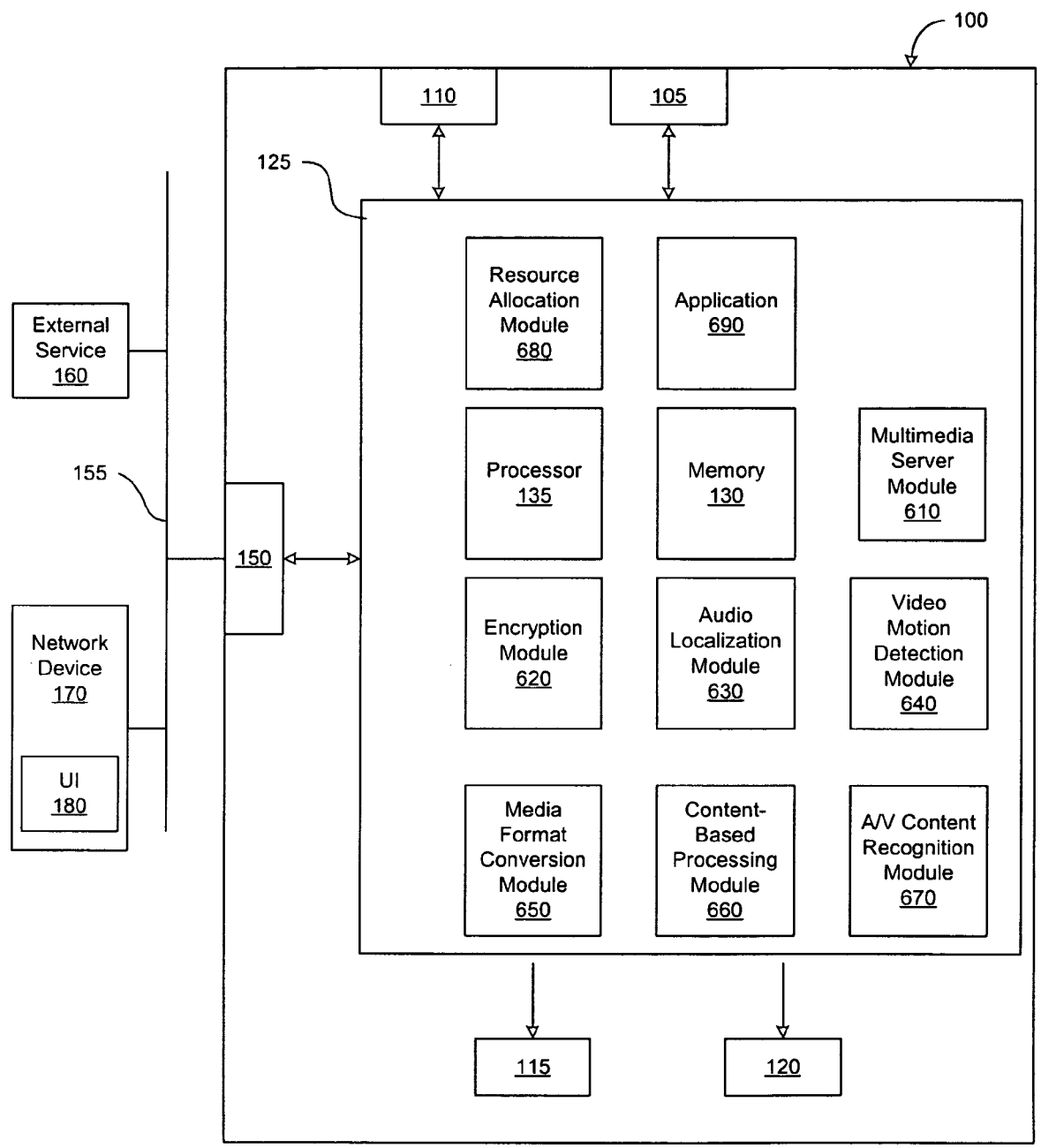
FIG. 6 is a schematic diagram of various media processing systems of the printer, in accordance with embodiments of the present invention.

In one embodiment, as illustrated in FIG. 6, the printer includes a resource allocation module 680 and one or a combination of embedded media processing modules. In other embodiments, a resource allocation module residing on an external system (e.g. 160, 170) controls the printer's 100 resources for processing a task. In this embodiment, examples of illustrated embedded media processing modules include an embedded multimedia server module 610, an encryption module 620, an audio localization module 630, a video motion detection module 640, a media format conversion module 650, a content-based processing module 660, and an A/V content recognition module 670. Each of these embedded functionality modules are described in further detail below.

Figure 2:
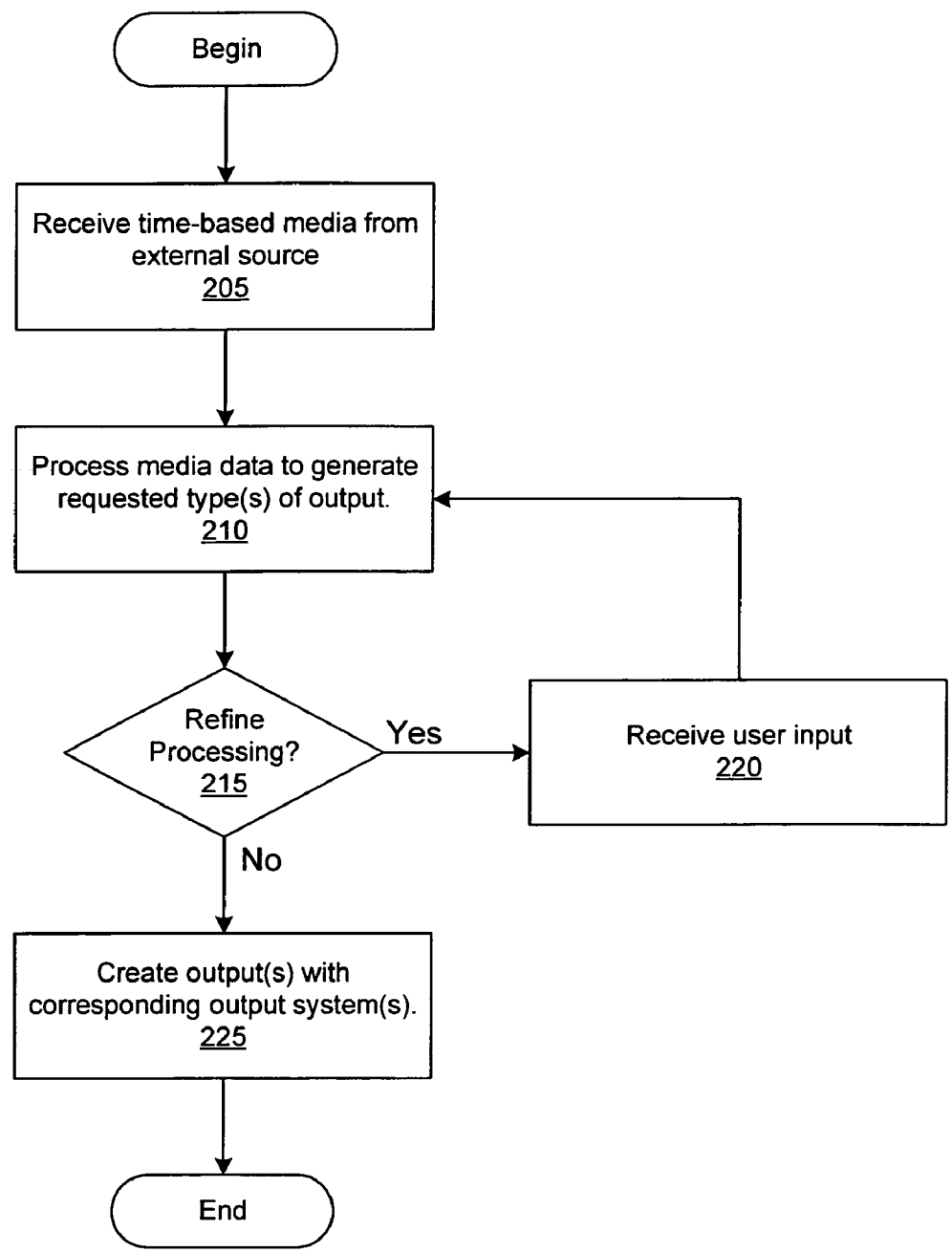
FIG. 2 is a flow diagram of the operation of the system in accordance with an embodiment of the present invention.

FIG. 2 shows an overview of a generalized process in which the printer 100 creates a representation of time-based media data 151, in accordance with one embodiment of the invention. The printer 100 first receives 205 time-based media 151 from an external source with the media interface 105 (which as discussed above can also include a network interface). In one example, the external source is identified by user input.

Figure 9:
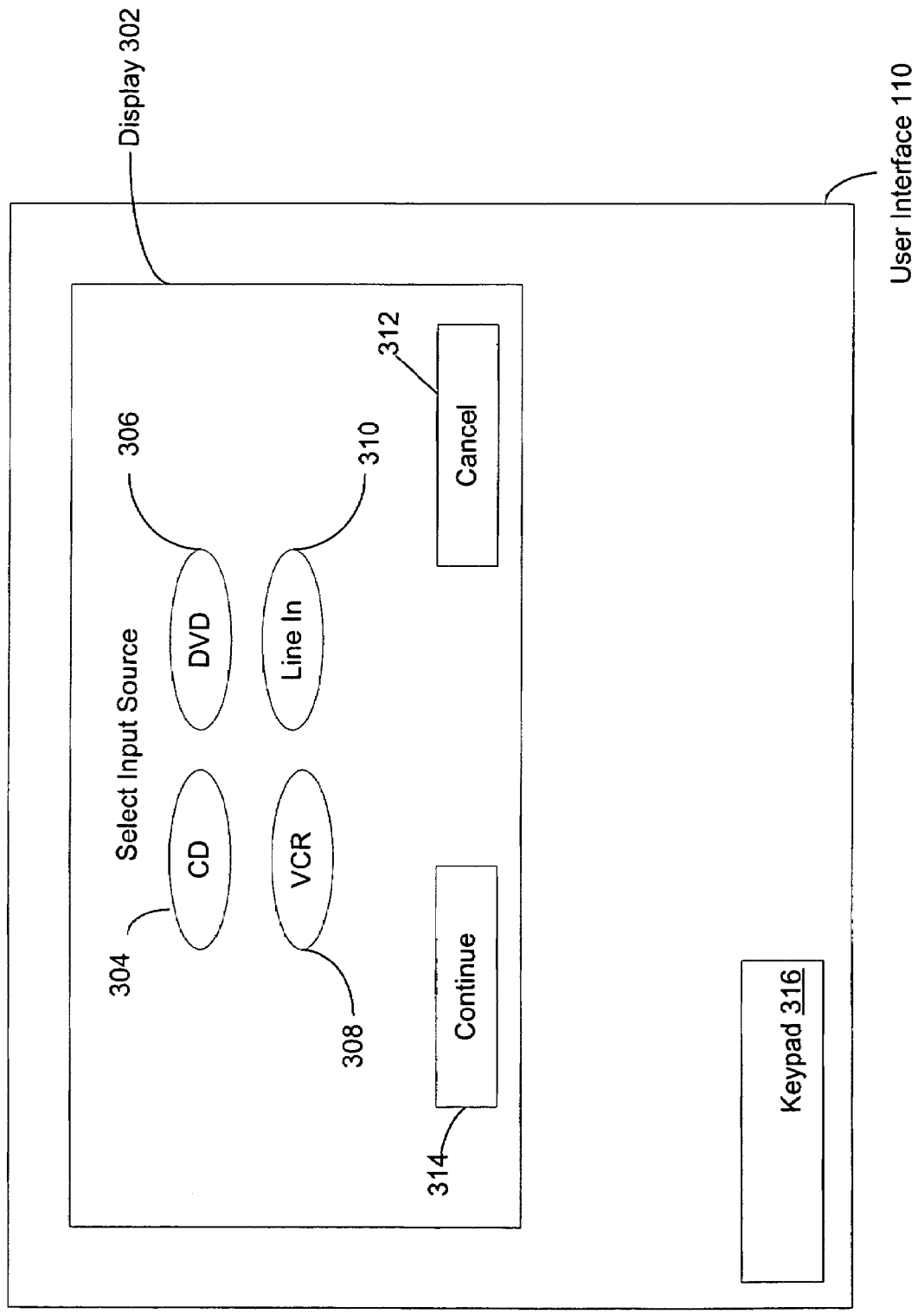
FIG. 9 illustrates an example of a user interface display for selecting an input source in accordance with an embodiment of the present invention.

FIG. 9 illustrates an example of a user interface display for selecting an input source in accordance with an embodiment of the present invention. Display 302, which can be displayed on a display of the printer's user interface 110 or on the user interface (e.g. 180) of an external system (e.g. 170, 160) includes an instruction to the user to "select input source", and several selections for the user to choose from. In the illustrated embodiment, the user can select from CD 304, DVD 306, VCR 308 and Line In 310. Those of skill in the art will appreciate that in other embodiments, other input sources will be available. Also shown is a Cancel button 312, should the user wish to cancel the action of selecting an input source, and a Continue button 314 for finalizing the selection. In a preferred embodiment, the user makes a selection by touching the appropriate button on the screen. In an alternative embodiment, the user can make the selection by pressing an appropriate button on keypad 316.

The media 151 may be received as digital or analog data, or it may be an observable event that the interface 105 records as digital or analog data. Coupled to the interface 105 to receive the media 151, the media processing system 125 processes 210 the media data to generate a requested type of output (e.g. printed or electronic).

Figure 10:
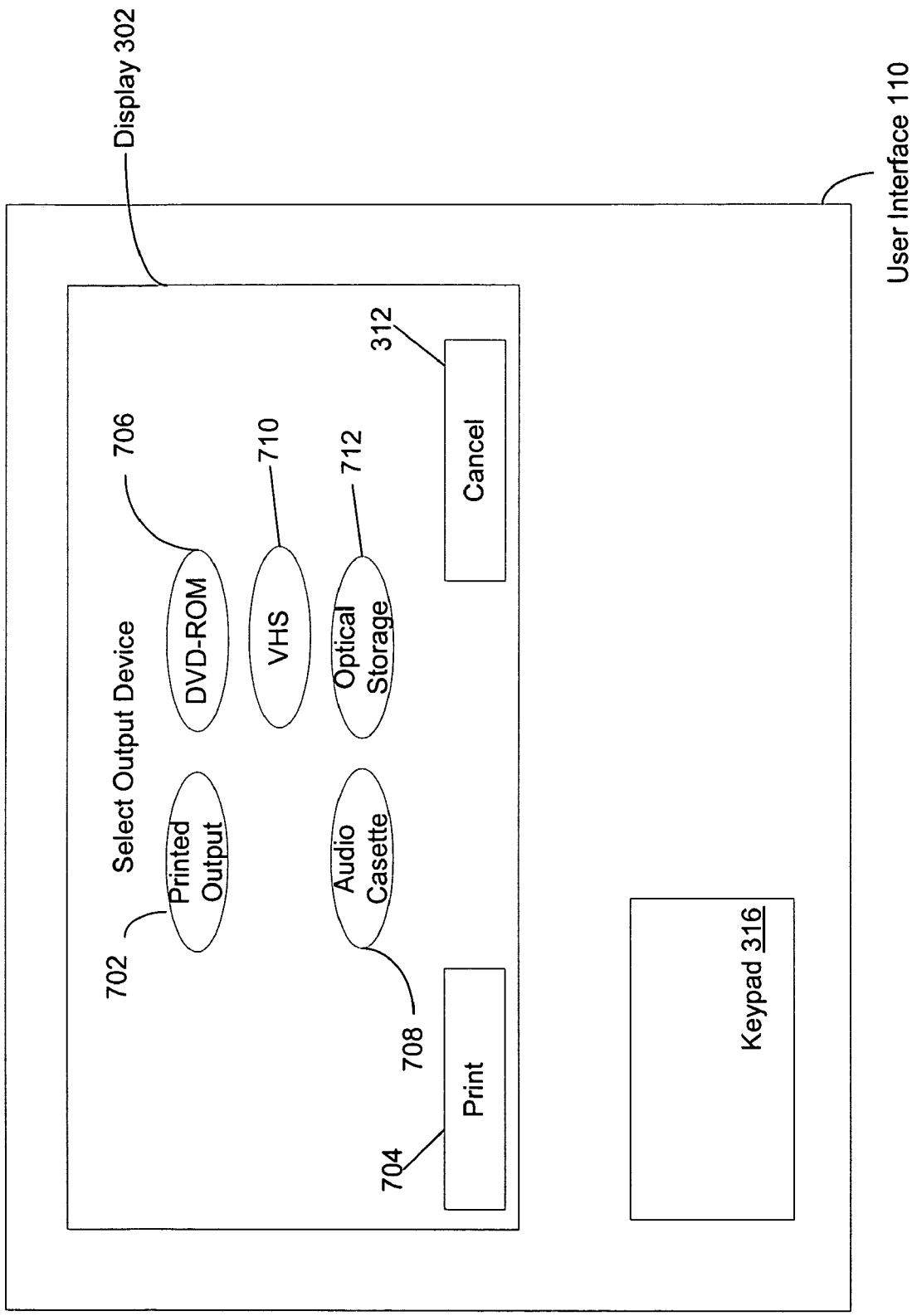
FIG. 10 illustrates an example of a user interface display for selecting one or more output devices for printing in accordance with an embodiment of the present invention.

FIG. 10 illustrates an example of a user interface display 302 for selecting one or more output devices for printing in accordance with an embodiment of the present invention. By selecting the Printed Output button 702, data will be routed to the printed output system 115 and be printed in a conventional manner by printer 100. If the user selects one of the buttons associated with the electronic output system 120, data will be routed to the particular output recipient selected, such as an output device or a networked external system. In the illustrated case of FIG. 10, the user can select a DVD drive 706, an Audio Cassette 708, VHS Cassette 710, or Optical Storage 712. Once the user has made his selection, he presses the Print button 704 to send the output to the selected locations, or Cancel 312 to quit.

Figure 11:
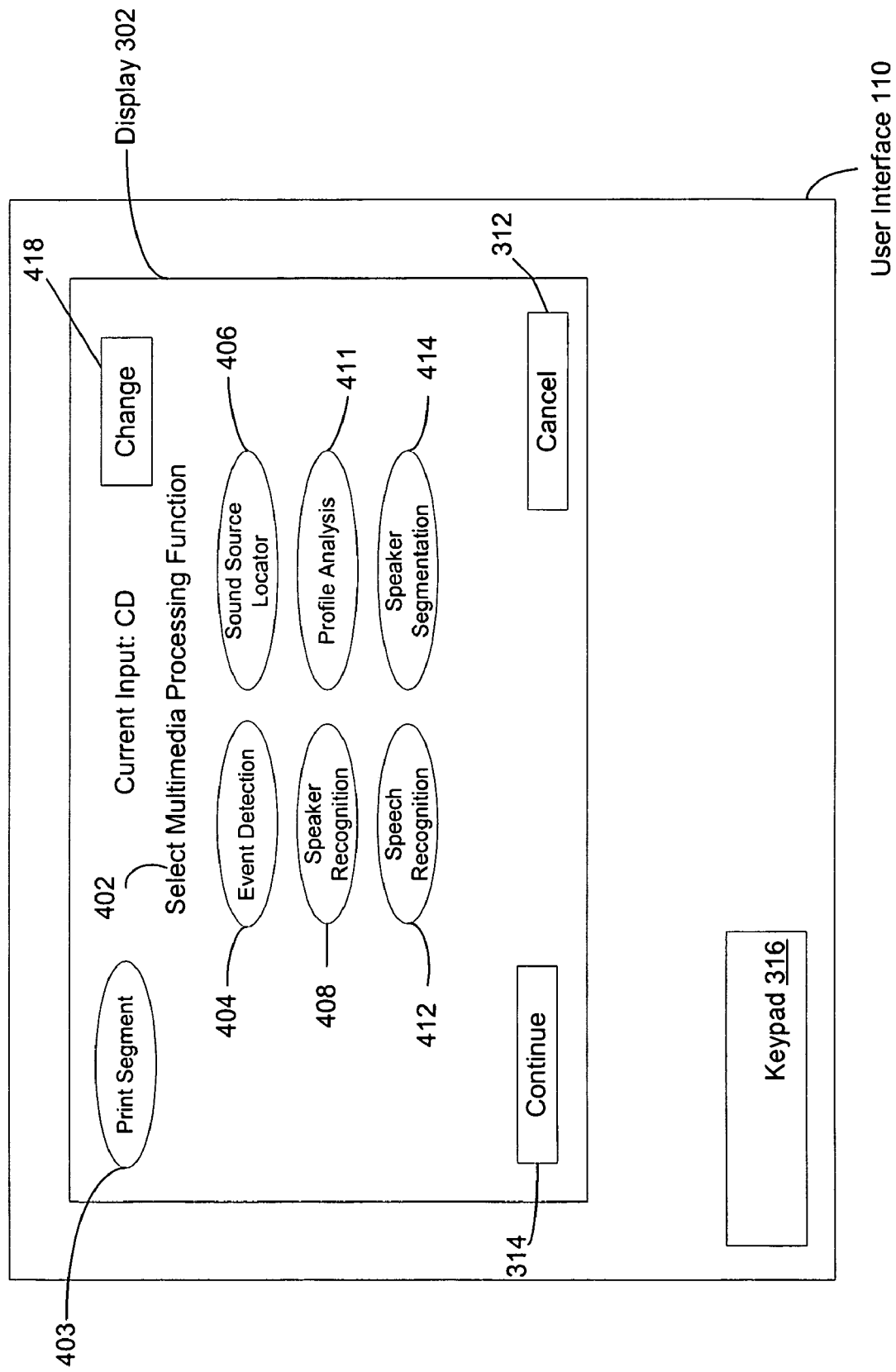
FIG. 11 illustrates a user interface display for selecting an audio multimedia processing function in accordance with an embodiment of the present invention.
Figure 12:
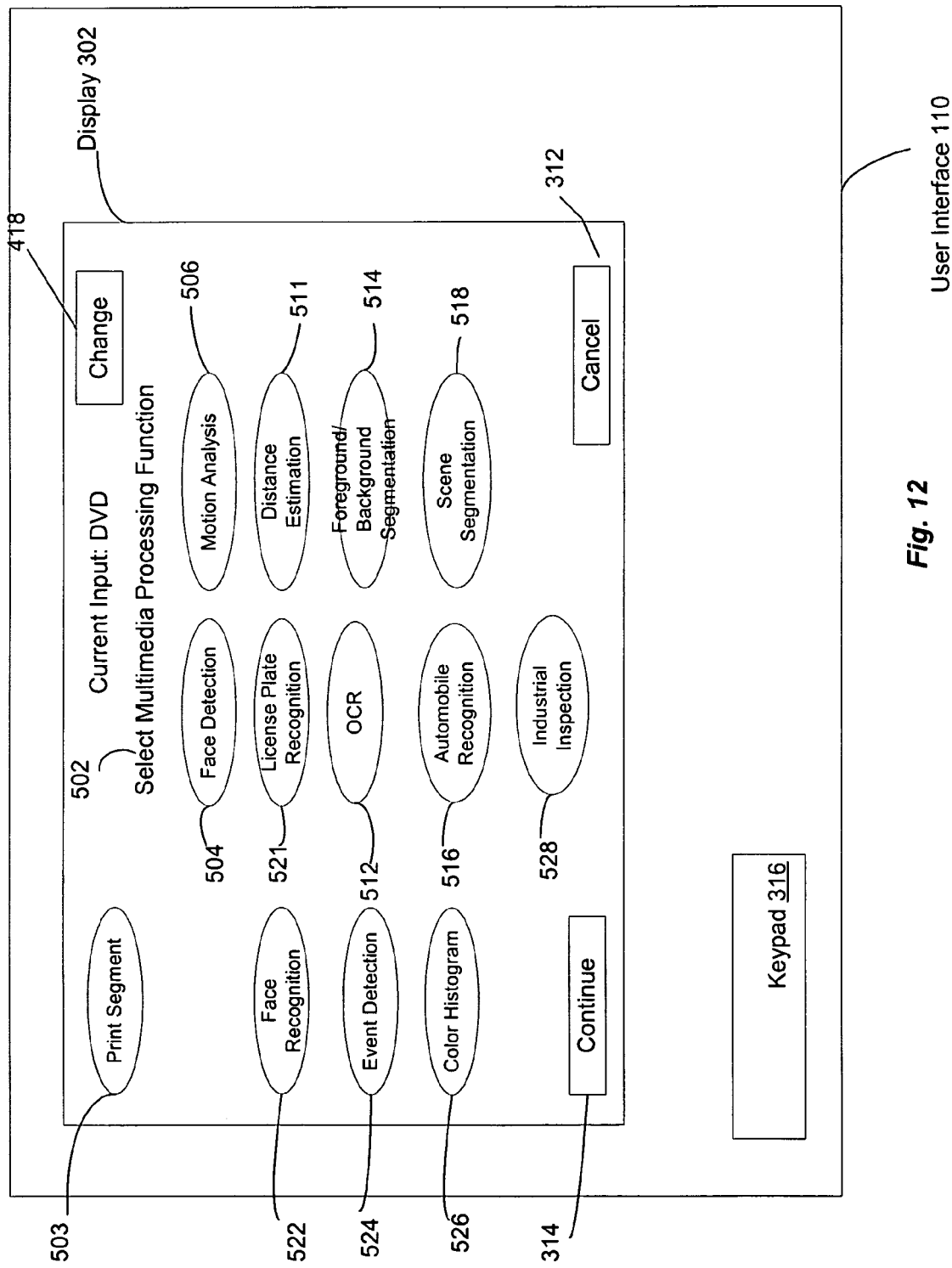
FIG. 12 illustrates a user interface display for selecting a video multimedia processing function in accordance with an embodiment of the present invention.

This media processing 210 is performed in accordance with the intended functionality of the printer 100, and examples of different operations are described in greater detail below. FIGS. 11 and 12 illustrate examples of different operations.

FIG. 11 illustrates a user interface display for selecting an audio multimedia processing function in accordance with an embodiment of the present invention. Available functions preferably include event detection, speaker segmentation, speaker recognition, sound source locator, speech recognition and profile analysis. As can be seen in FIG. 11, user interface 110 provides a user with the ability to select from among these options. In FIG. 11, display 302 of UI 110 includes a user instruction 402, instructing the user to select the desired multimedia processing function. Display 302 also includes the available options, which in the illustrated case are print segment 403, event detection 404, sound source locator 406, speaker recognition 408, profile analysis 411, speech recognition 412, and speaker segmentation 414. A button 418 is also provided in one embodiment to allow the current input to be changed, as described above with respect to FIG. 9. Finally, a cancel button 312 is available that returns the user to a previous screen, and a continue button 314 is available to be selected when the user has specified all of the desired processing functions.

FIG. 12 illustrates a user interface display for selecting a video multimedia processing function in accordance with an embodiment of the present invention. Available functions preferably include event detection, color histogram analysis, face detection, face recognition, optical character recognition (OCR), motion analysis, distance estimation, foreground/background segmentation, scene segmentation, automobile recognition, license plate recognition, and industrial inspection. As can be seen in FIG. 12, user interface 110 provides a user with the ability to select from among these options. In FIG. 12, display 302 of UI 110 includes a user instruction 502, instructing the user to select the desired multimedia processing function. Display 302 also includes the available options, which in the illustrated case are selectable via buttons for Print Segment 503, Event Detection 524, Color Histogram Analysis 526, Face Detection 504, Face Recognition 522, Optical Character Recognition (OCR) 512, Motion Analysis 506, Distance Estimation 511, Foreground/Background Segmentation 514, Scene Segmentation 518, Automobile Recognition 516, License Plate Recognition 521 and industrial inspection 528. A button 418 is also provided in one embodiment to allow the current input to be changed, as described above with respect to FIG. 9. Finally, a cancel button 312 is available that returns the user to a previous screen, and a continue button 314 is available to be selected when the user has specified all of the desired processing functions.

A number of specific embodiments for these multimedia processing functions, which can reside on the printer 100 or an external system (e.g. 170, 160), illustrated in FIGS. 11 and 12 are described in co-pending U.S. patent application entitled "Multimedia Print Driver Dialog Interfaces," filed Mar. 30, 2004, Ser. No. 10/814,944, which is hereby incorporated by reference.

In one embodiment, the system includes a printer embedded user interface 110 and/or a user interface (e.g.) 180 at a coupled external device (e.g. networked external device 170 or a docked cell phone or personal digital assistant) to allow a user to preview the generated outputs. If the user desires to refine 215 the processing, the user can enter commands, which the printer 100 receives 220 by way of the user interface (e.g. 110 or 180). Based on the user's commands, the printer 100 then repeats the processing 210 of the media data to generate new output. This refinement process can be iterated until the user is satisfied with the printed 175 or electronic output 190. When this occurs, the user will indicate that the printing should commence, for example, by invoking a print command with the user interface (e.g. 110 or 180) (See, for example, FIG. 10 discussed above.) The media processing system 125 then sends the generated output to the corresponding output system (e.g. printed output 175 to the printed output system 115 or the electronic output 190 to the electronic output system 120). The corresponding output system 115, 120 then creates 225 an output.

It can be appreciated that this generalized description of a multifunction printer lends itself to a great number of specific configurations and application. Accordingly, examples of the possible configurations, applications, and components are further described.

Although the media processing system 125 can be configured with no coupling to an external system and performs processing of the media data on the printer 100, the system 125 is preferably coupled to an external computing device or external service that shares some of the computing burden. In the illustrated example of FIG. 1, the printer 100 includes a network interface 150 to allow communication with an external network device 170 and/or external service 160, which are capable of performing at least a portion of the media processing functionality. The network device 170 may be a computer system or a dedicated media processing hardware device. In this way, the printer 100 relieves the source of the time-based media from at least some of the processing burden required to implement the printer's functionality, but the printer 100 need not shoulder the entire burden. The printer 100 can thus avoid slow-downs that can result from a heavy processing load, which may be especially important for shared printers.

Figure 7:
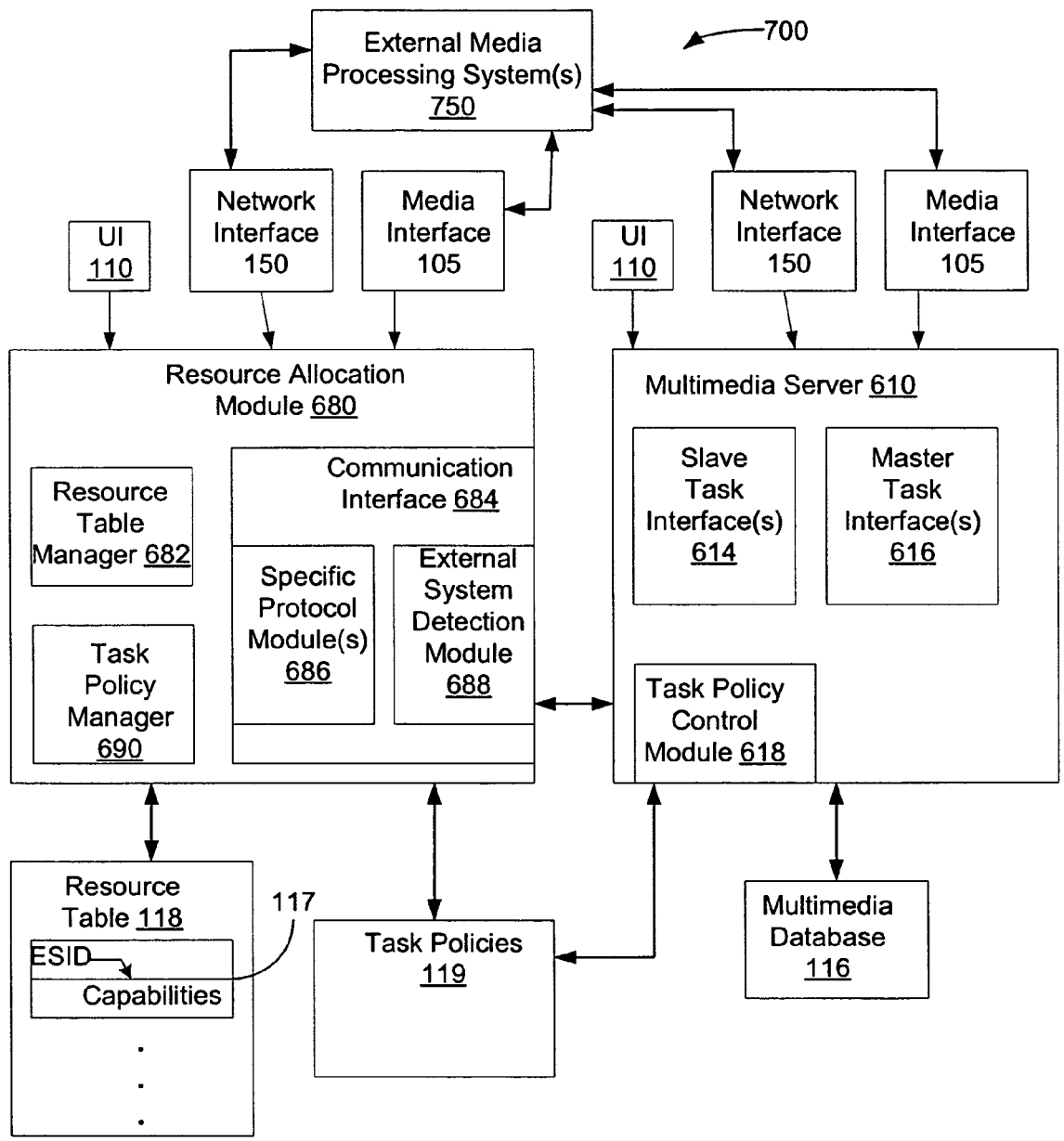
FIG. 7 is a schematic diagram of a sub-system for allocating processing for media tasks among printer and external media system resources in accordance with an embodiment of the present invention.

FIG. 7 is a schematic diagram of a sub-system for allocating processing for media tasks among printer and external media system resources in accordance with an embodiment of the present invention. The sub-system 700 comprises a resource allocation module 680 accessible to a resources table 118, and a task policies table 119 stored in a memory 130 and communicatively coupled to an external media processing system 750 via a network interface 150 or other type of media interface 105 and to a user interface 110 of the printer 100 and/or to a user interface 180 of an external system 750. The sub-system 700 further comprises a multimedia server 610 also having access to a multimedia database 116 stored in a memory 130 and the task policies table 119 and being communicatively coupled to the resource allocation module 680 and also to an external media processing system 750 via a network interface 150 or other type of media interface 105 and to a user interface 110 of the printer 100 and/or to a user interface 180 of an external system 750.

The resource allocation module 680 comprises a communication interface module 684 which includes an external system detection module 688 and one or more specific communication protocol modules 686, a resource table manager 682, and a task policy manager 690. The external system detection module 688 detects the presence of an external system. For example, the module 688 is notified that an external device has connected to a port or is notified via a registration message of the availability of an external service. The external system detection module 688 can utilize such protocols as Plug and Play (PnP) or Universal Plug and Play (UPnP) to automatically detect and communicate with devices that have PnP capabilities. Similarly, the communication interface module 684 can use a UPnP protocol to communicate directly with a device, identify its capabilities, and learn about the presence and capabilities of other devices attached to it. UPnP is an example of a specific protocol that may be used by a UPnP specific protocol module 686 for communication with a device. Examples of other protocols include device specific protocols, proprietary protocols, standards based protocols, http and other World Wide Web based protocols. Different embodiments can comprise one or a combination of specific protocol modules. From the communication interface 684, the resource table manager 682 retrieves the capabilities of the external device or service and stores a profile 117 of those capabilities so that they are associated with the respective device, for example, by an external system identifier (ESID) in the resource table 118. The resource table manager 682 notifies the task policy manager 690 with the ESID that an external system profile 117 has been updated. Examples of capabilities are processor characteristics; processing level or percentage of a service, for example a busy message, or average time for task completion; a current processor usage percentage; software applications, for example voice recognition software; hardware functionality, for example transcoding hardware; or memory availability. Based on the capabilities of the printer 100 and the external system 750 and criteria such as computing power, availability, functionality or user input, the task policy manager 690 defines or updates existing policies for tasks. A policy directs which resources will be used for tasks, and in what role, master or slave, the different resources operate. In one embodiment, a master resource controls the processing for a task. For example, a master controls the order in which a request will be processed. For example, a multimedia server 610 acting as an http server in a client/server relationship determines the order in which client requests for video files are processed. In another example, a master task interface 616 controls the operation of an external device or sends commands to control certain functionalities of the external device. For example, the task policy control module 618 enforces a task of communicating with a docked cell phone as requiring a software driver (e.g., a master task interface 616) of the multimedia server 610 that acts in a master role. The driver communicates with a docked cell phone to download pictures from the cell phone or to issue commands to the cell phone to take a picture with the cell phone's digital camera or take a video with the cell phone's video camera. The picture can show who is standing at the printer 100, and that data could be transmitted to some other destination by the cell phone when it calls out under the direction of the printer. The called number could be stored in a profile stored on the cell phone, or it could be stored on the printer for use in generating a video paper document 175 or an electronic output 190. In one embodiment, a slave responds to the master's instructions and waits for further instructions from the master until released from the master due to timeout or task completion or other criteria. For example, the multimedia server 619 can comprise a slave software interface that stores MPEG2 data in the multimedia database 116 when received from a master transcending hardware module of an external video recorder connected through a port or network connection to the printer 100. In one embodiment, a task policy is embodied in an Extensible Markup Language (XML) document. The task policy manager 690 notifies the multimedia server 610 that a policy has been updated or created and provides the ESID.

Responsive to the notification, the multimedia server 610 retrieves the identified policy. In this embodiment, the multimedia server comprises a task policy control module 618 that receives the policy update/creation notifications and enforces the policies. The policy control module 618 is communicatively coupled to master interface modules 616 for tasks and slave interfaces modules 614 for tasks. Depending on the task, the policy control module 618 executes either a master interface module 616 or a slave interface module 614.

Figure 8:
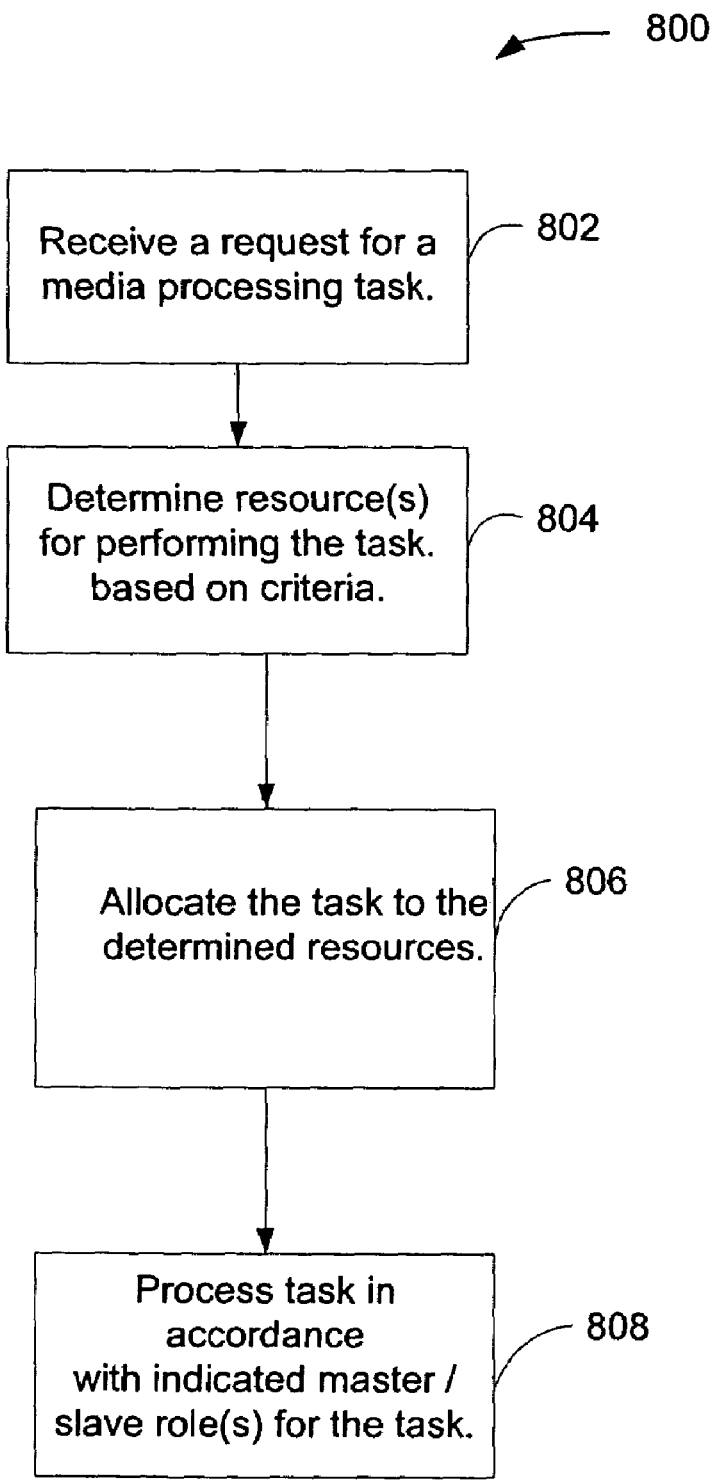
FIG. 8 is a flow diagram of a method for allocating resources for a media processing task in accordance with an embodiment of the present invention.

FIG. 8 is a flow diagram of a method for allocating resources for a media processing task. For illustrative purposes, this method is discussed in the context of the resource allocation module 680 of FIG. 6. The resource allocation module 680 receives 802 a request for a media processing task. Such a request can be generated by user input or from an external device or external service. The module 680 determines 804 a resource or resources for performing the task based on criteria. An example of a resource is an embedded media processing module or a combination of such modules. Another example or a resource is media content processing software available at an external service, or multimedia format transformation hardware and/or software on an external device. Criteria can be based on user input. For example, user interface 110 displays on a display (e.g. web display 545) a list of external services and/or external devices accessible by the printer 100 as well as printer resources that can perform a media processing task, for example, segmenting a video into clips. A mouse click or touchscreen can be used to indicate selection of a resource or data entry (e.g. typed keyboard entry or a selected directory path from a directory listing of an external device); to indicate an external system identifier (ESID), for example, a Uniform Resource Indicator (URI) or Uniform Resource Locator (URL); or to indicate software and/or hardware and/or firmware or an external device by an identifier such as a directory location. A resource allocation example arises in the context of a printer with hardware and/or software interfaces for a portable meeting recorder. A portable meeting recorder, composed of a video camera with a 360-degree lens and a microphone, is docked to the printer 100. The multimedia data files are downloaded to the printer. The content-based processing module 660 dewarps the video and extracts key frames from the multimedia data files. Those key frames are chosen to show at least one image of every meeting attendee. Face detection and tracking can be used to find the largest and most well-composed image of each participant. In this example, a task policy 119 associated with the portable meeting recorder device may allocate the sub-task of face recognition to an external application on an external computer system 170 on an internal network 155 of a business because the compute system has a very fast processor and access to a database of face recognition files identifying people associated with the business such as employees, contractors, customers or visitors. Or the task policy 119 can reflect user input indicating whether the face recognition is performed by the A/V content recognition module 670 or the external application.

Figure 13:
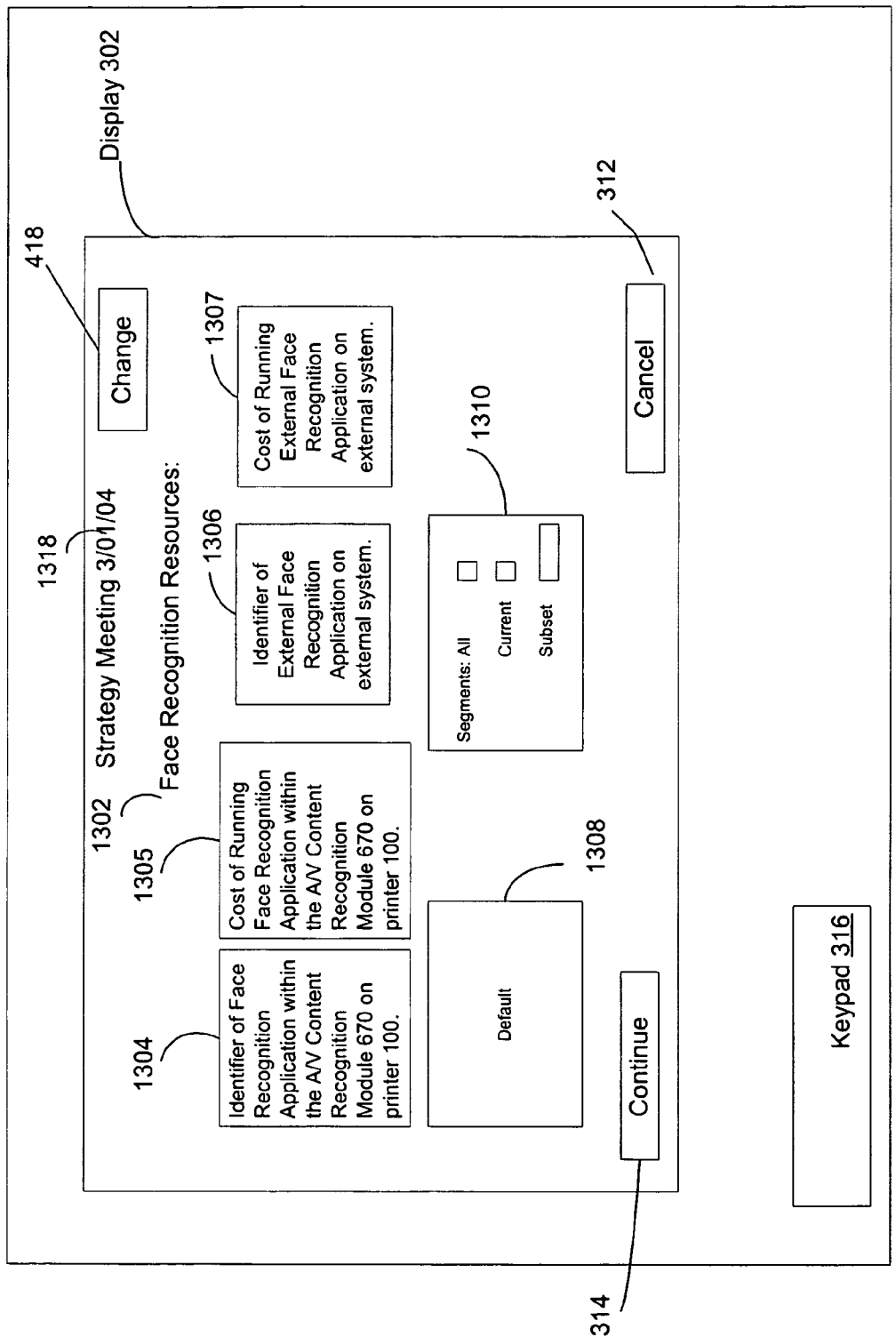
FIG. 13 illustrates an example of a user interface display for enabling a user to allocate processing resources from among or between printer resources and external system resources in accordance with an embodiment of the present invention.

A media processing resource performs a function related to a media processing task, for example format conversion or segmentation of an audio or video selection into clips. A media processing resource can be implemented in hardware, software, firmware or a combination of these. Hardware can include both electronic and optical hardware. FIG. 13 illustrates an example of a user interface display for enabling a user to allocate media processing resources from among or between printer resources and external system resources in accordance with an embodiment of the present invention. The user interface display includes an identifier 1318 of the content selection being processed, in this example, an MPEG-2 file entitled "Strategy Meeting Mar. 1, 2004" and a sub-title 1302 indicating the task or sub-task with which the resources are allocated, in the example, "Face Recognition Resources." The display also includes several selection indicators. A selection indicator 1304 represents an identifier of a printer resource, in this example, an identifier of a face recognition application within the A/V Content Recognition Module 670. An indicator 1305 represents the monetary cost of running the face recognition application within the A/V Content Recognition Module 670 (e.g., it might be licensed to charge the user per invocation). A selection indicator 1306 represents an identifier of an external resource, in this example, an identifier of an external face recognition application on an external device or service. An indicator 1307 represents the monetary cost of running the face recognition application on the external device or service. More selection indicators for additional resources can be displayed based on their availability in the system. A default selection indicator 1308 when selected provides user input indicating to the resource allocation module 680 to use a default allocation of resources for this task. Once the face recognition is complete, in one example, a specialized face tracking application 690 or in another example, the content-based processing module 660, performs the tracking of the identified face in the video's content. In this example, a user can decide to allocate the printer's face recognition application to a subset of video segments and allocate the external application to process another subset of video segments from the video. The user display 302 includes a segment selection indicator 1310 allowing a user to select all, the current segment, or a subset. This allows the user to indicate parallel processing for the face recognition task by allocating different resources to different segments of the video. A video paper document (printed output 175) is created from the multimedia recording that includes bar codes that refer to the multimedia data stored on the portable meeting recorder, or an associated PDA. The multimedia is played by swiping the bar codes with a tethered bar code reader or by imaging the bar codes with a video camera interfaced to the portable meeting recorder.

Figure 14:
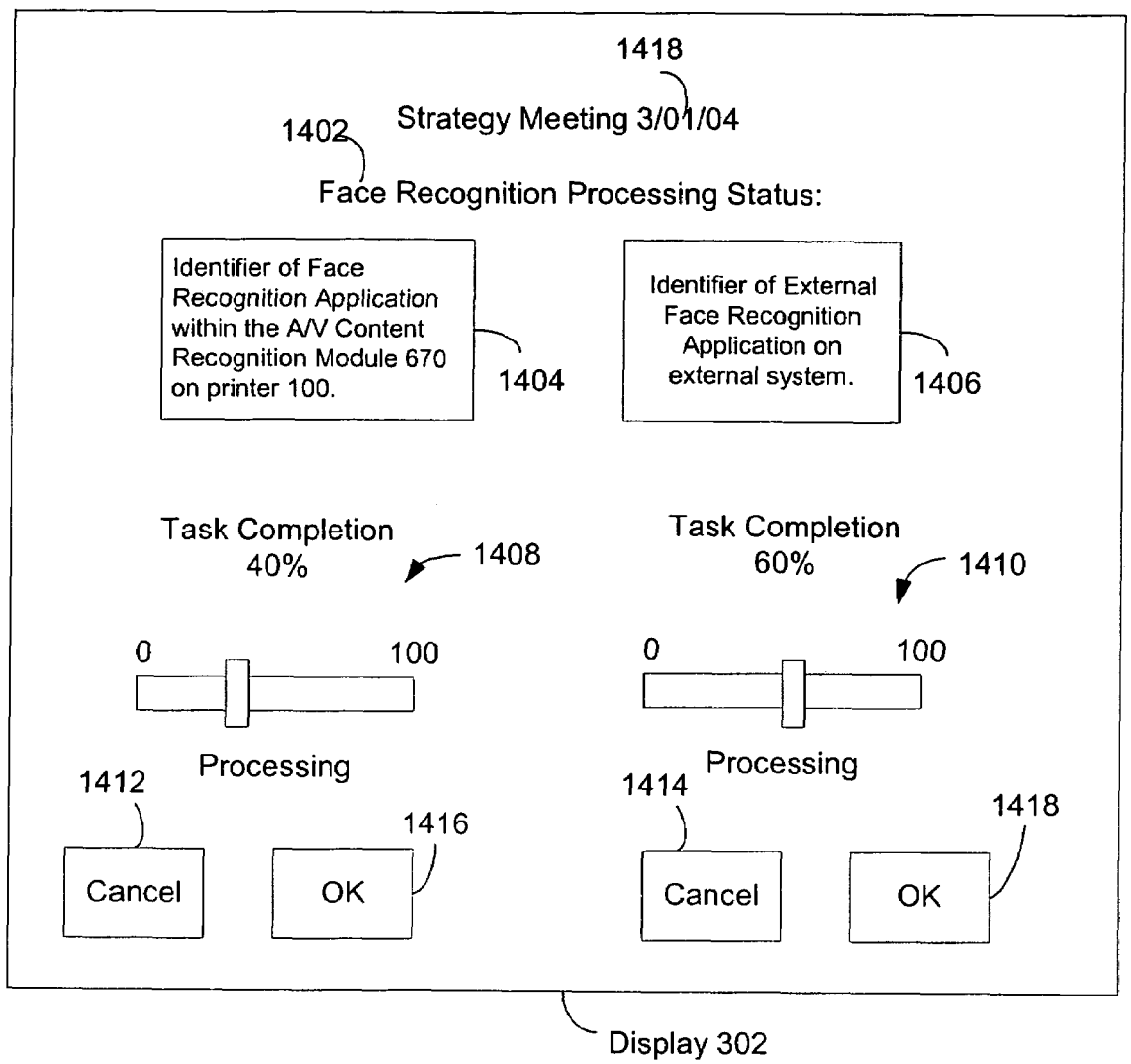
FIG. 14 illustrates an example of a user interface display for displaying the status of processing a task in accordance with an embodiment of the present invention.

FIG. 14 illustrates an example of a user interface display for displaying the status of processing a task in accordance with an embodiment of the present invention. The user interface display 302 includes an identifier 1418 of the content selection being processed, again in this example, the MPEG-2 file entitled "Strategy Meeting Mar. 1, 2004," and a sub-title 1402 indicating the task or sub-task with which the displayed processing status of resources is applicable, in the example, "Face Recognition Processing Status." The display also includes one or more resource identifiers 1404, 1406. In this example, an identifier 1404 represents a face recognition application within the A/V Content Recognition Module 670, and an identifier 1406 represents an external face recognition application on an external system. For the printer resource, slider 1408 indicates that 40% of the face recognition task it is processing is complete, and for the external system resource, slider 1410 indicates that 60% of the face recognition task it is processing is complete. Responsive to user input indicating selection of an associated cancel button 1412, 1414, the task processing on the associated resource is stopped. Responsive to user input indicating selection of an associated "OK" button 1416, 1418, the user interface 110 exits the processing status display 302. The user interface displays can also be displayed on a user interface (e.g. 180) of an external system (e.g. 170, 160).

Another criteria is speed or availability of a resource. For example, preferably the embedded version of a media processing module may be the preferred resource for a task, but if it is busy processing another task, perhaps on a separate embedded processor within the printer 100, the same module or an earlier version of the module on a networked computer 170 can be allocated to process this task. This can provide faster response time to the user. A resource on a networked device 170 may have the fastest processor in the network, so it may make sense to assign the task to that processor if it is not busy. The module 680 allocates 806 the task to the determined resources. The determined resources process 808 the task in accordance with master or slave role indicated for the task. A task can include sub-tasks or be a sub-task of another task. One sub-task of a task can be performed by one resource in a slave role, while another sub-task of the task can be performed by the same resource in a master role. In one example, the master or slave role can be stored in a table in memory 130 for each media processing task to be performed by the printing system. A system administrator can determine which media processing functions individually or in combination form a task and can set-up such a role table (e.g. task policy table 119) in memory 130. The criteria for allocating resources dynamically such as user input or speed or availability can also determine the role a printer resource plays and an external resource plays in accomplishing a task. Consider an example, in which an external media processing device of video transcoding hardware is assigned the master role in downloading a video file to the multimedia server 610 acting in a slave device role. The transcoding hardware has a master software interface that notifies the multimedia server, for example via an interrupt, when it is sending content from the file. The multimedia server 610 has a slave software interface that is notified by the interrupt and responsive thereto, performs processing to receive the content and store it in its associated file. The transcoding hardware is the master because it determines when downloading occurs. In another example, the multimedia server executes a master software interface in controlling the storage of multimedia content in its multimedia database 116 from an external web service having a software interface acting like a slave device under the command of the multimedia server. Roles can change for different tasks, and a resource, internal or external, can have both a master interface or a slave interface. Either interface may be implemented in hardware, firmware or software or in any combination of them. It should be noted that several similar or identical printers might work in cooperation, as peers, dynamically trading master and slave roles as needed to meet user needs.

In another example, a resource allocation module of an external system, for example a web-based service such as a movie or music distribution site that sells and/or rents movies or songs, controls what content selections, e.g. stored versions of movies or songs are stored in the multimedia database 116 on the printer 100. Examples of criteria that the external service 160 can base storage allocations determinations on is that the latest releases or the top 100 songs on a music sales chart are stored in the multimedia database 116 for faster local retrieval while other songs or movies are stored on memory devices accessible by the printer 100 over a network 155.

In general, conventional printer drivers in modern operating systems are not designed to facilitate interactive information gathering. Because the print job can be redirected to another printer, or the printing protocol does not allow such interactive sessions, the operating system does not encourage interaction with the user. Once initial printer settings are captured, further interactions are generally not allowed in conventional printers. One approach to this problem is to embed metadata into the print stream itself. However, it is possible that the printer could need to ask the user for more information, in response to computations made from the data supplied by the user. In addition, the printer might be sharing processing of tasks with an application or device of an external system, which might in turn need more information from the user. So-called "Web services" or "grid computing" systems are examples of external systems with which the printer might share processing.

Figure 15:
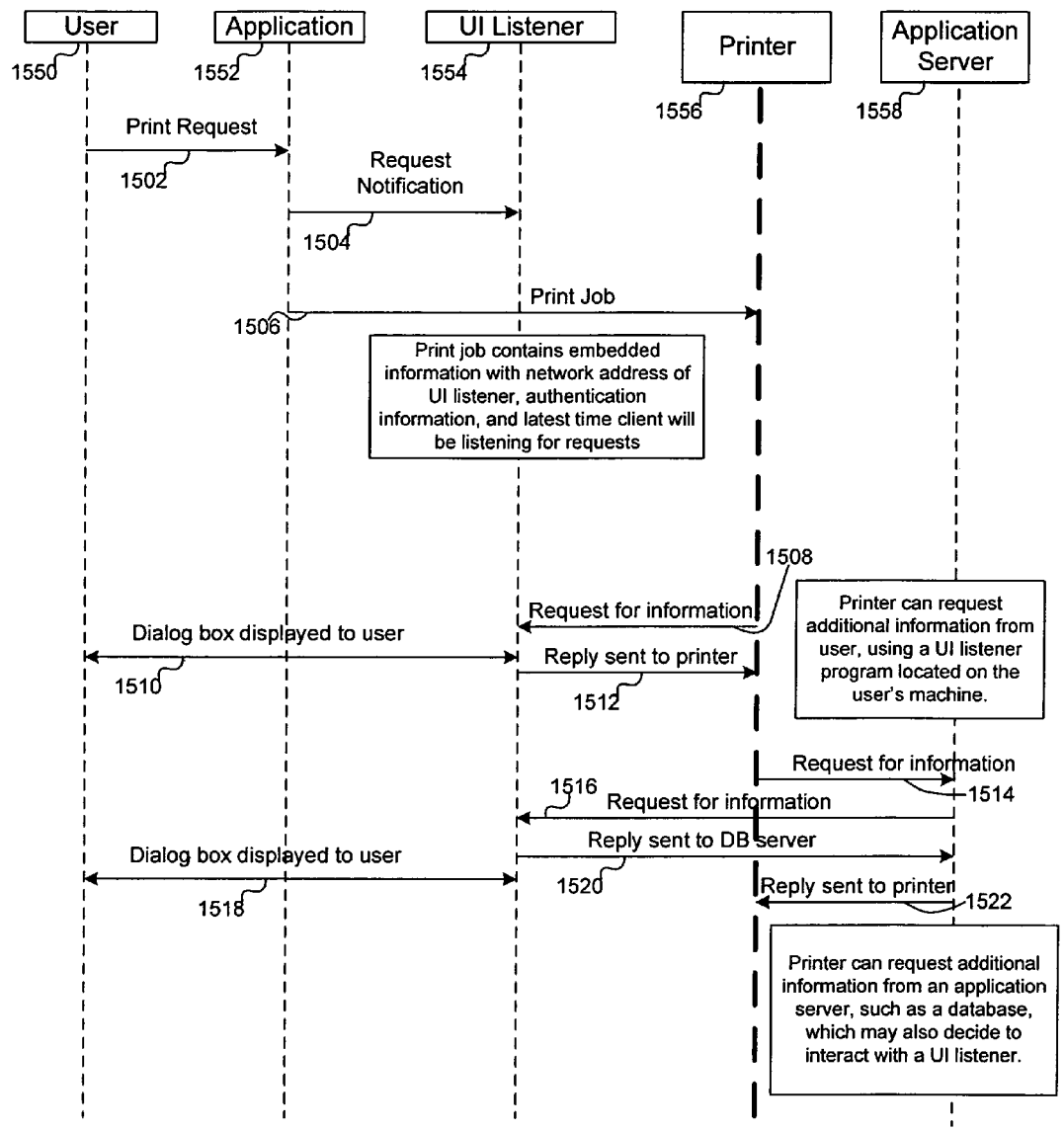
FIG. 15 is an illustration of a method of interactive communication between the printer and an external system to request and send user input in accordance with an embodiment of the present invention.

In order to allow this interaction, without modifying printer driver architecture of the underlying operating system, an extra mechanism, such as the one shown in FIG. 15, is constructed. A "UI Listener" program 1554 listens to a network socket, accepts requests for information 1508, interacts with a user to obtain such data, and then sends the data back to the requester.

Once a print request 1502 is sent by user 1550 and notification is requested 1504 from the UI listener 1554, the print job is sent 1506 by application 1552. Here, the print job contains embedded information including the network address of the UI listener 1554, authentication information, and the latest time that the client will be listening for requests.

If the printer 1556 requires additional information or confirmation, it sends a request 1508, which is detected by the UI listener 1554, which displays a dialog box 1510 to obtain input from the user 1550. An example of such a request might be a request for a password or user confirmation code that the user must enter to accessan application server 1558. The user's input is included in a reply 1512 sent to the printer. If the reply does not satisfy the printer it may ask for additional information (not shown). If the reply does satisfy the printer, it takes a next step. This step might be to perform an external action such as sending an email (not shown). The next step might also be sending a request for information 1514 to an application server (such as a database) 1558. In this example, application server 1558 also sends a request for information 1516, which is detected by the UI listener 1554. The user 1550 is prompted 1518 and his response forwarded 1520 to the application server 1558. In this example, a reply 1522 is then sent from the application server 1558 to the printer 1556. It will be understood that a particular embodiment may include either or none of requests 1508 and 1516 without departing from the spirit of the present invention.

A UI listener program such as that shown in FIG. 15 as UI Listener 1554 may have a fixed set of possible interactions, or may accept a flexible command syntax that allows the requester to display many different requests. An example of such a command syntax would be the standard web browser's ability to display HTML forms. These forms are generated by a remote server, and displayed by the browser, which then returns results to the server. In this embodiment, however, the UI listener is different from a browser in that a user does not generate the initial request to see a form. Instead, the remote machine generates this request. In the described embodiment, the UI listener is a server, not a client.

Because network transactions of this type are prone to many complex error conditions, a system of timeouts would be necessary to assure robust operation. Normally, each message sent across a network either expects a reply or is a one-way message. Messages which expect replies generally have a timeout, a limited period of time during which it is acceptable for the reply to arrive. In this embodiment, embedded metadata would include metadata about a UI listener that will accept requests for further information. Such metadata preferably includes at least a network address, port number, and a timeout period. It might also include authentication information, designed to prevent malicious attempts to elicit information from the user. Because the user cannot tell whether the request is coming from a printer, a delegated server, or a malicious agent, prudence suggests strong authentication by the UI listener. Information which specifies the correct authentication data would be sent as a part of Request Notification 1504, along with timeout information and the identity of the requesting printer, in one embodiment. If the printer or a delegated application server wishes more information, it can use the above noted information to request that the UI listener ask a user for the needed information.

Printer With Multimedia Functionality

As explained, the printer 100 may include an embedded multimedia server module 610 that enables the printer 100 to act as a multimedia server and have associated functionality. In various embodiments, the multimedia server module 610 includes hardware and software for carrying out multimedia functionality, media processing software, and computer interface hardware and software. In this way, the printer 100 can act like a multimedia server, which could be shared by a work group or used as a personal printer. In one embodiment, the multimedia server 610 manages the multimedia database 116 by storing and retrieving content selections as well as creating meta-data associated with each content selection to identify it or maintain instructions associated with it. An example of a content selection is a video file, an audio file, or a text file. The following examples illustrate that embodiments of printer 100 including the multimedia database 116 could be very useful in a walk-up kiosk as can be found in a convenience store.

Consider an example in which the multimedia database 116 includes a music catalog, or a video database, or a movie database or a digital photo catalog, or a combination of one or more of these media types. The user interface 110 displays a print dialog box on the display (e.g. display 545) which presents the user with a list of the songs, a list of video recordings, a list of movies or a list of photos, resident in the printer 100 or accessible to it via an external service 160 or external device 170. The user can choose to "print" any of those songs, videos, movies or photos. Responsive to input indicating a content selection, if previewing is a feature of the printer, and user input indicates 215 previewing is requested, the content selection is provided 225 in the sensual form appropriate to its type. For example, if a song is selected and previewing is requested, a digital version of the song is retrieved from the database 116, converted from digital to analog form (e.g., A/D 335) and played through a speaker system 330 for the user. In a similar fashion, the media processing system 125 can cause a video to be displayed, or a preview version of it to be displayed, on an embedded or attached video display 535. Similarly, a selected photo forwarded from a web server of an external service 160 can be previewed and displayed on the web page display 545. In another example, the database is communicatively coupled to an internal database (e.g. of company recorded meetings). Additionally, in the example of an embedded digital photo catalog, a user can select pictures for printing or generate an index document of photos without having to turn on a separate computer networked to the printer. For example, if every time a user prints a jpeg image, the printer automatically or under control of the print dialog box, saves a copy of the jpeg on the printer, she can build a personal photo archive and peruse the archive without turning on her desktop computer.

During the previewing of the content selection, a user may have made edits, such as marks or annotations, to the content selection using multimedia content editing software which can be saved to a new version of the content selection temporarily stored in a local memory portion of memory 130. Responsive to user input indicating criteria for a content index document, content indexing software generates an index document for the content selection. The index paper document can indicate only the marked portions or the whole content selection (See Video Paper patent applications). The print out would be a convenient time-saver allowing one to browse what occurred in a meeting, while away from a network connection that would enable replaying of the digital media. The print out would also be a convenient time-saver allowing one to browse what occurred in a movie, while away from a network connection that would enable replaying of the digital media.

Responsive to user input indicating a preferred print medium, the multimedia server 610 transfers the content selection in a format suitable for that print medium to the suitable printed output system 115 or the electronic output system 120. In the case of the song catalog, examples of the print medium that can be used are a CD or cassette. In the case of a video or a movie, examples of the print medium that can be used are a DVD or videocassette. In the case of the photos, examples of the print medium that can be used are paper or a memory stick. In one example, the database of content selections can be updated through a network interface 150 by downloading from a web site via the web server for instance. Various embodiments of a multifunction printer having multimedia functionality are possible applications for a printer in accordance with embodiments of this invention. A number of specific embodiments for such a printer are described in a co-pending U.S. patent application entitled, "Printer with Multimedia Server," filed Mar. 30, 2004, Ser. No. 10/814,842, which application is incorporated by reference in its entirety.

Printer With Encryption Functionality

Similarly, the printer 100 may include an embedded encryption module 620, which enables the printer 100 to perform encryption functions on the received media data. In a typical application, the printer 100 receives a media file to be encrypted, encrypts the file, and then writes the encrypted media file onto a removable storage device. The printer 100 also prints an associated paper output that provides information about the encryption, such as the encryption key, a password, an identification of the media, and optionally a description of the content of the media encrypted.

While various embodiments of a multifunction printer having encryption functionality are possible applications for a printer in accordance with embodiments of this invention. A number of specific embodiments for such a printer are described in a co-pending U.S. patent application entitled, "Multimedia Output Device Having Embedded Encryption Functionality," filed Mar. 30, 2004, Ser. No. 10/814,841, which application is incorporated by reference in its entirety.

Printer With Audio Localization and/or Video Motion Detection Functionality

In addition, the printer 100 may include an embedded audio localization module 630 and/or an embedded video motion detection module 640, which enable the printer 100 to produce outputs based on the location of sound or the detection of motion in the received media. In this way, the printer can observe events and aid the user in filtering through a massive amount of data about those events.

In one embodiment, the printer 100 includes embedded audio capture and sound source localization hardware. In another embodiment, or in addition, the printer 100 includes video capture and motion detection hardware and software. In this way, the printer 100 can create a printed document 175 and an electronic output 190 that, together, summarize the audio and/or video events that were detected. The events can be defined and their representation in a document can be designed before the events occur. That information can then be communicated to the printer 100 by printing the document before the events happen. The printer can recognizes future events in the documents it receives and schedule documents for printing after the events are detected. This may be helpful, for example, to verify the creation of intellectual property or to detect the time when a burglar entered an office. If the documents are printed, the paper can be easily incorporated in an existing paper-based workflow.

In an example embodiment, the media data include video data with a separate multi-channel audio track that was produced from a known configuration of microphones. In this way, the system can be designed to optimize audio source localization. The printer can then create outputs based on the result of sound localization and user input that indicates the directions of interest to the user. For example, clips can be selected from the video when people in those locations were speaking. Key frames and bar codes for those clips can then be printed on the printed output.

Various embodiments of a multifunction printer having audio localization and/or video motion detection functionality are possible applications for a printer in accordance with embodiments of this invention. A number of specific embodiments for such a printer are described in a co-pending U.S. patent application entitled, "Printer with Audio/Video Localization," filed Mar. 30, 2004, Ser. No. 10/813,946, which application is incorporated by reference in its entirety.

Printer With Media Format Conversion Functionality

As explained above, the printer 100 may include an embedded media format conversion module 650. The media format conversion module 650 enables the printer 100 to convert the received media data into various formats other than that in which it is received. The media format conversion module 650 may include appropriate hardware and software for carrying out its functionality, such as audio rendering software, processing logic for different types of media conversions, and a speaker output. In this way, the printer 100 may contain an embedded formatter that can decode, encode, and/or convert media data from one format type into another format type.

In one embodiment, the printer 100 converts a digital audio file, such as a MIDI file, into a paper representation as a musical score. Optionally, the printer 100 also converts the input data to another audio format, such as MP3, that could be played on other devices, such as a cell phone. Bar codes can be added to a printed paper representation of the media to let the user play the audio corresponding to lines of music on a remote device or through the speaker on the printer.

Various other embodiments of a multifunction printer having audio format conversion functionality are possible applications for a printer in accordance with embodiments of this invention. A number of specific embodiments for such a printer are described in a co-pending U.S. patent application entitled, "Music Processing Printer," filed Mar. 30, 2004, Ser. No. 10/813,849, which application is incorporated by reference in its entirety.

Printer With Content-Based Processing Functionality

As explained, the printer 100 may include an embedded content-based processing module 660, which enables the printer 100 to receive and process real-time broadcasts of media data responsive to the content of the media. In one embodiment, the printer 100 includes an embedded receiver, such as a television, satellite, or cable, radio, or other type of media receiver. The printer 100 may further include processing logic that can monitor a live media feed, record media, generate a printed representation of the media, and play the audio or video on the printer's console. The printer 100 thus enables the live monitoring of the content of radio or television broadcasts and the generation of paper and storage of multimedia in response to events detected in those streams.

Examples of events include tone sequences indicative of National Weather Service or Emergency Alert Service alerts, but they could also include user-defined events such as the appearance of a specified set of key words in the closed caption of a television broadcast, the appearance of a given image in a video stream (e.g., a face image), or the occurrence of gun shots in an audio stream. The instant generation of the paper when events occur allows the user to pick up a print-out off the printer at any later time without needing to press any other buttons or performing other manual operations.

Various embodiments of a multifunction printer having content-based processing functionality are possible applications for a printer in accordance with embodiments of this invention. A number of specific embodiments for such a printer are described in a co-pending U.S. patent application entitled, "Printer with Audio or Video Receiver, Recorder, and Real-Time Content-Based Processing Logic," filed Mar. 30, 2004, Ser. No. 10/813,846, which application is incorporated by reference in its entirety.

Printer With Audio/Video Content Recognition and Processing Functionality

As explained, the printer 100 may include an embedded A/V content recognition module 670, which enables the printer 100 to recognize particular properties in the content of the media data and process the data based on that recognized content. In one embodiment, the printer 100 receives the media data from an electronic file, which the printer 100 uses to convert the time-based media into related printed 175 and electronic outputs 190. In one embodiment, the printer 100 includes audio and/or video content recognition and processing software and/or hardware. The types of embedded hardware and software required depend on the desired content recognition functionality, and examples of the types of functionalities the embedded A/V content recognition module 670 may perform include video event detection, video foreground/background segmentation, face detection, face image matching, face recognition, face cataloging, video text localization, video optical character recognition (OCR), language translation, frame classification, clip classification, image stitching, audio reformatting, speech recognition, audio event detection, audio waveform matching, caption alignment, audio-caption alignment, and any other type of media content recognition algorithms. The printer 100 further includes processing logic that interacts with the user through the user interface 110 to generate the desired printed 175 and electronic outputs 190.

Various embodiments of a multifunction printer having audio/video content recognition and processing functionality are possible applications for a printer in accordance with embodiments of this invention. A number of specific embodiments for such a printer are described in a co-pending U.S. patent application entitled, "Printing System with Embedded Audio/Video Content Recognition and Processing," filed Mar. 30, 2004, Ser. No. 10/813,950, which application is incorporated by reference in its entirety.

Printer With Cell Phone Interface

A cell phone is docked directly with the printer 100, thereby eliminating the need to attach the cell phone to a PC. The multimedia processor 125 of the printer 100 automatically downloads still frame images, audio and video clips that are resident on the cell phone to the printer 100. The content-based processing module 660 represents the data as a video paper document, and prints that document. The multimedia data output can also be sent to an electronic output system 120 where the data can be written on an external storage site, or a removable media card. The media card can be played on the cell phone using the cell phone digital camera as a bar code reader. Or if the media were uploaded to a web site via network connection 150 that provides a streaming media service, the user could call that site and play the media on the cell phone after entering the necessary access codes. Keying digits on the keypad of the cellular phone provides random access to points in the recording indicated by bar codes and other human-readable text. That text can also include phone numbers called while the corresponding multimedia data were recorded. If those phone numbers correspond to address book data on the cellular phone, it can also be included in the printed output 175.

Printer with Hardware and Software Interface for Camcorder

A video camcorder is docked directly with the printer 100, thereby eliminating the need to attach the camcorder to a PC, and the still frame images, audio and video clips that are resident on the camcorder are downloaded to the printer 100 via multimedia server 610 and which are formatted by the content-based processing module 660 as a video paper document which the printed output system 115 prints. The multimedia data can also be written on an external storage site, or a removable media card. The media card can be played on the camcorder, using its camera as a bar code reader. Or if the media can be uploaded to a web site that provides a streaming media service via network interface 150 that couples the printer to a web server on the network 155, the user can login to that site later and play the media in a web browser after entering the necessary access codes. Other human-readable text could be printed near the bar codes that indicate the date and time when the recording was made as well as the location of the person, if available from something like a GPS receiver.

Printer with Hardware and Software Interface for Digital Audio Recorder

An external digital audio recorder (DAR), like those used by doctors to record notes about patients' medical charts, is interfaced to a printer. The display on the printer is configured to read information about the content of the DVR over a serial port. This information is printed in various formats, such as a program guide or as an Audio Paper document that shows the meta information about each recording such as when it occurred, its duration, where the user was supposed to be, as provided by his online scheduler, etc. Bar codes, when swiped, cause the DAR to begin playing the audio recording from the corresponding point. Those clips can also be uploaded to a web site that provides access to the audio over the phone. The user can call the audio server and key in access code information as well as clip identification data that cause any clip to begin playing from the appropriate point in time.

Printer with Hardware and Software Interface for Fixed Position Meeting Recorder A meeting recorder in a conference room is equipped with a Print button. Pressing the Print button triggers software that formats the most recently recorded meeting as Video Paper with bar codes that refer to data stored on the local system. The appropriate audio capture software and hardware are provided so that sound localization can be performed in real-time and post-processed to produce Video Paper which segments the recording by the position from which the sound emanated in the room. A suitable representation is used to provide access to the recorded data. For example, sectors of a circle can be annotated with colors and bar codes that provide access to the points in the recording when the person at that location began speaking. Additional meta information could be printed next to the sector that shows how many times the person at that location spoke and the total amount of time they used. This could also be encoded in the color assigned to the sector. For example, red could indicate the person who dominated the meeting. A similar sector icon could be used to annotate a time line so that by looking at the time line and the icon, the user could tell where the person was sitting who was speaking at that time and approximately how long they spoke for.

Printer with Hardware and Software Interface for Fixed Position Meeting Recorder with Pan Tilt Zoom Capture Capability A meeting recorder camera in a conference room has the ability to pan, tilt, and zoom its view while recording a meeting. These capabilities can be combined with real-time sound localization and tracking to produce a video recording which captures not only the dialog in a meeting but also what is written on a whiteboard and what appears on the display screen for the projector. This system can also be equipped with a Print button that when pressed generates a Video Paper representation for the recorded multimedia. This document will include images of the whiteboards when their content changes significantly as well as key frames that were captured when the camera head was panned or tilted significantly to track action in the room.

Printer with Hardware and Software Interface for Head-Mounted Video Camera with Gyroscope and GPS Capture A head-mounted video camera, such as those commonly used to capture the video record of a person using a wearable computer or similar device, is docked with the printer 100. It downloads the multimedia data from the camera and creates a video paper representation for it that is outputted to the electronic output system 120 and stored on the printer 100 or reprocessed and uploaded to a web hosting service via network 155. The media processing system 125 extracts key frames the video file when the person's head moves significantly, as detected by the gyroscopic tracking software in the camera, or when the person's geographic position changes significantly, as indicated by the GPS system. This data can be correlated with symbolic information stored on the web or in the user's personal organizer which correlates geographic position with logical location, such as 36 degree 20 minutes North 47 degrees 2 minutes West is Work, to produce a document that can be selectively formatted to show only the people spoken with at Work, for example. In another case, the individual might choose to print only the faces of the people he met while at Costco.

Printer with Hardware and Software Interface for Office-based PC Experience Capture System One or more video cameras are configured to record the actions that take place in a user's office during the normal workday. This system can distinguish between a person working in isolation at their PC and new people walking into the office. This system is equipped with a Print button that when pressed creates a Video Paper document which shows key frames and bar codes representative of events that the system has been pre-configured to consider interesting. For example, this might show a key frame and bar code for every visitor that entered the office that day.

Printer with Hardware and Software Interface for Video from PC Frame Buffer

The video that appears on a PC user's screen is captured using the video capture 355 by sampling key frames from the PC's display buffer and creating a video file from that, or by tapping the video cable from the PC to its monitor. A video paper document is created from that which shows key frames only when there is a significant change in what's displayed on the monitor of the PC. This can occur when the user views a new web page, for example. Bar codes are displayed near those key frames that provide access to the video file.

General Comments

While examples of suitable printing systems are described above, the description of the printer and its document production means is not meant to be limiting. Depending on the intended application, a printer can take many different forms other than the typical office or home-use printer with which most people are familiar. Therefore, it should be understood that the definition of a printer includes any device that is capable of producing an image, words, or any other markings on a surface. Although printing on paper is discussed above, it should be understood that a printer in accordance with various embodiments of the present invention could produce an image, words, or other markings onto a variety of tangible media, such as transparency sheets for overhead projectors, film, slides, canvass, glass, stickers, or any other medium that accepts such markings.

In addition, the description and use of media and media data are not meant to be limiting, as media may include any information used to represent any kind of media or multimedia content, such as all or part of an audio and/or video file, a data stream having media content, or a transmission of media content. Media content may include one or a combination of audio (including music, radio broadcasts, recordings, advertisements, etc.), video (including movies, video clips, television broadcasts, advertisements, etc.), software (including video games, multimedia programs, graphics software, etc.), and pictures; however, this listing is not exhaustive. Furthermore, media data may further include anything that itself comprises media content or media data, in whole or in part, and media data includes data that describes a real-world event. Media data can be encoded using any encoding technology, such as MPEG in the case of video and MP3 in the case of audio. They may also be encrypted to protect their content using an encryption algorithm, such as DES, triple DES, or any other suitable encryption technique.

Moreover, any of the steps, operations, or processes described herein can be performed or implemented with one or more software modules or hardware modules, alone or in combination with other devices. It should further be understood that portions of the printer described in terms of hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing the steps, operations, or processes described herein.

In alternative embodiments, the printer can use multiple application servers, acting in cooperation. Any of the requests or messages sent or received by the printer can be sent across a network, using local cables such as IEEE1394, Universal Serial Bus, using wireless networks such as IEEE 802.11 or IEEE 802.15 networks, or in any combination of the above.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A printer for printing time-based media, the printer comprising:
 a media processing system embedded within the printer for generating an electronic representation of the time-based media;
 an electronic output system for producing a document on a media from the electronic representation of the time-based media;
 a housing for supporting an interface for transferring the time-based media between the printer and an external processing system, and for supporting the electronic output system in communication with the media processing system to receive the electronic representation;
 a resource allocation module embedded within the printer for determining processing allocation for one or more tasks among the printer and the external processing system; and
 a task policy manager for determining whether the printer will interact with the external processing system as a master processor or as a slave processor to process the one or more tasks, the determination based on a policy stored in association with the one or more tasks.

2. The printer of claim 1, wherein the external system is another multimedia printer coupled via a network to the interface for transferring time-based media.

3. The printer of claim 1, wherein the external system is a remote external service system coupled via a network to the interface for transferring time-based media, the external service system in communication with the media processing system for performing at least some processing steps for the time-based media.

4. The printer of claim 1, further comprising a user interface for receiving user input indicating selection of one or more media processing resources from among resources of the printer and the external system.

5. The printer of claim 4 wherein the user interface displays a request for user input from the external system.

6. The printer of claim 4 wherein the user interface displays processing status of task being processed by the external system.

7. The printer of claim 1, wherein the printer is coupled to the external system providing a user interface to the printer, the user interface for receiving user input indicating selection of one or more media processing resources from among resources of the printer and the external system.

8. The printer of claim 7 wherein the user interface displays a request for user input from the printer.

9. The printer of claim 7 wherein the user interface displays processing status of task being processed by the printer.

10. The printer of claim 1, wherein the interface comprises a communication interface allowing the system to be communicatively coupled to an electronic device, the electronic device providing the time-based media to the system.

11. The printer of claim 1, wherein the interface comprises a removable media storage reader.

12. The printer of claim 1, wherein the interface comprises a media input device selected from a group consisting of: a DVD reader, a video cassette tape reader, a CD reader, an audio cassette tape reader, and a flash card reader.

13. The printer of claim 1, wherein the interface comprises a media broadcast receiver that can be tuned to a media broadcast.

14. The printer of claim 1, wherein the interface comprises an embedded receiver selected from a group consisting of: an embedded TV receiver, an embedded radio receiver, an embedded short-wave radio receiver, an embedded satellite radio receiver, an embedded two-way radio, and an embedded cellular phone.

15. The printer of claim 1, wherein the interface comprises an embedded device selected from a group consisting of: an embedded heat sensor, an embedded humidity sensor, an embedded National Weather Service radio alert receiver, and an embedded TV Emergency Alert System (LAS) alert monitor.

16. The printer of claim 1, wherein the interface comprises embedded screen capture hardware.

17. The printer of claim 1, wherein the interface comprises an ultrasonic pen capture device.

18. The printer of claim 1, wherein the interface comprises an embedded video recorder, wherein the time-based media is a series of images captured by the embedded video recorder, converted into an electrical format, and then provided to the media processing system.

19. The printer of claim 1, wherein the interface comprises an embedded audio recorder, wherein the time-based media is a series of sounds that are converted into an electrical format by the embedded audio recorder and then provided to the media processing system.

20. The printer of claim 1, wherein the electronic output system is configured to write the electronic representation to a removable media storage device.

21. The printer of claim 20, wherein the removable storage device is selected from a group consisting of: a DVD, a video cassette tape, a CD, an audio cassette tape, a flash card, a computer disk, an SD disk, and a computer-readable medium.

22. The printer of claim 1, wherein the electronic output system comprises a handling mechanism to accommodate a plurality of removable storage devices.

23. The printer of claim 22, wherein the handling mechanism is selected from a group consisting of: a feeder, a bandolier, and a tray.

24. The printer of claim 1, wherein the electronic output system comprises a media writer selected from a group consisting of: a disposable media writer and a self-destructing media writer.

25. The printer of claim 1, wherein the electronic output system is coupled to a speaker system and sends an audio signal to the speaker system.

26. The printer of claim 25, wherein the electronic output system comprises an embedded sound player for generating the audio signal.

27. The printer of claim 1, wherein the electronic output system comprises an embedded web page display.

28. The printer of claim 1, wherein the media processing system comprises an embedded multimedia server.

29. The printer of claim 1, wherein the media processing system comprises an embedded audio encryption module.

30. The printer of claim 1, wherein the media processing system comprises an embedded video encryption module.

31. The printer of claim 1, wherein the media processing system comprises an embedded audio sound localization module.

32. The printer of claim 1, wherein the media processing system comprises an embedded video motion detection module.

33. The printer of claim 1, wherein the media processing system determines a printed representation of the time-based media; and the system further comprises a printed output system in communication with the media processing system to receive the printed representation, the printed output system producing a corresponding printed output from the printed representation of the time-based media.

34. The printer of claim 33 wherein the printed output system is one of the group of a laser printer, an inkjet printer, a thermal wax transfer printer, a dye sublimation printer, a dot matrix printer, or a plotter.

35. The printer of claim 33, farther comprising a user interface that provides information to a user about at least one of the printed representation and the electronic representation of the time-based media, the user interface further accepting input from a user to cause the media processing system to modify at least one of the printed representation and the electronic representation of the time-based media.

36. The printer of claim 33, wherein the media processing system determines at least one of the printed representation and the electronic representation with assistance from the external system that is an external computing device.

37. A method for printing time-based media in a printer for printing time-based media comprising a media processing system for generating an electronic representation of the time-based media, the method comprising:

receiving user input indicating selection of one or more media processing resources from among resources of the printer and an external processing system;

determining processing allocation for one or more tasks among the printer and the external processing system determining whether the printer will interact with the external processing system as a master processor or as a slave processor to process the one or more tasks, the determination based on a policy stored in association with the one or more tasks; and determining the electronic representation of the time-based media using the determined allocation of resources.

38. The method of claim 37 wherein a user interface embedded on the printer displays a request for the user input.

39. The method of claim 38 wherein the user interface displays processing status of task being processed by the external system.

40. The method of claim 37, wherein a user interface that is a part of the external system displays a request for the user input.

41. The method of claim 40, wherein the user interface displays processing status of a task being processed by the printer.

\* \* \* \* \*